United States Patent
Hinduja et al.

(10) Patent No.: US 11,995,616 B2
(45) Date of Patent: *May 28, 2024

(54) ASSET HEALTH MANAGEMENT FOR VEHICLES

(71) Applicant: ANI TECHNOLOGIES PRIVATE LIMITED, Bengaluru (IN)

(72) Inventors: Hitesh Hinduja, Thane (IN); Gaurav Agarwal, Bangalore (IN); Krishna Koushik Vsr, Bangalore (IN); Smruti Chourasia, Jabalpur (IN); Shreya Kekkar, Pune (IN); Hrishikesh Bharadwaj Chakrapani, Bangalore (IN); Punit Mahipal, Bangalore (KR)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 484 days.

This patent is subject to a terminal disclaimer.

(21) Appl. No.: 17/139,953

(22) Filed: Dec. 31, 2020

(65) Prior Publication Data
US 2022/0114559 A1   Apr. 14, 2022

(30) Foreign Application Priority Data
Oct. 9, 2020  (IN) ............................ 202041044112

(51) Int. Cl.
*G06Q 10/20*   (2023.01)
(52) U.S. Cl.
CPC .................... *G06Q 10/20* (2013.01)
(58) Field of Classification Search
CPC .... G06Q 10/02; G06Q 10/20; G06Q 30/0645; G06Q 20/00; G06N 20/00
(Continued)

(56) References Cited

U.S. PATENT DOCUMENTS 8,620,714 B2   12/2013  Williams
9,317,977 B2 *  4/2016  Amirpour .............. G07C 5/008
(Continued)

FOREIGN PATENT DOCUMENTS

CN      103279879 A      9/2013
CN      105354638 A      2/2016
(Continued)

OTHER PUBLICATIONS

Killeen, P., Ding, B., Kiringa, I., & Yeap, T. (2019). IoT-based predictive maintenance for fleet management. Procedia Computer Science, 151, 607-613. (Year: 2019).*
(Continued)

*Primary Examiner* — John S. Wasaff
(74) *Attorney, Agent, or Firm* — CHIP Law Group

(57) ABSTRACT

A method for asset health management is provided. The method includes receiving, first maintenance data, first booking data, first vehicle data, first operational data, and a labelled dataset for a set of vehicles over a first time-interval. The labelled dataset includes at least an actual health index for each vehicle observed over the first time-interval. The method includes determining a first plurality of features and a corresponding first plurality of feature values based on the first maintenance data, the first booking data, the first vehicle data, and the first operational data. The method includes training a prediction model based on the first plurality of features, the first plurality of feature values, and the labelled dataset. The method includes determining a health index of a target vehicle based on the trained first prediction model and a first dataset associated with the target vehicle.

12 Claims, 9 Drawing Sheets

(58) Field of Classification Search
USPC .......................................................... 705/305
See application file for complete search history.

(56) References Cited

U.S. PATENT DOCUMENTS

| | | | |
|---|---|---|---|
| 9,836,714 B2 | 12/2017 | Lander | |
| 10,818,108 B2 | 10/2020 | Wang | |
| 2007/0027593 A1* | 2/2007 | Shah | B60W 50/00 702/33 |
| 2011/0082804 A1* | 4/2011 | Swinson | G06Q 30/02 705/306 |
| 2014/0214696 A1* | 7/2014 | Laughlin | G06Q 30/0283 705/306 |
| 2016/0063418 A1 | 3/2016 | Roddy | |
| 2016/0078695 A1* | 3/2016 | McClintic | G07C 5/0816 701/29.4 |
| 2016/0110933 A1* | 4/2016 | Ahn | G07C 5/0808 701/31.9 |
| 2016/0153806 A1* | 6/2016 | Ciasulli | G06Q 10/0633 702/183 |
| 2016/0196701 A1* | 7/2016 | Strother | G06Q 10/06 701/29.3 |
| 2017/0169399 A1* | 6/2017 | Areshidze | G06Q 30/0283 |
| 2018/0068355 A1* | 3/2018 | Garry | G07C 5/0808 |
| 2018/0082342 A1 | 3/2018 | Cahan | |
| 2019/0156298 A1* | 5/2019 | Ethington | G06Q 10/0635 |
| 2019/0197798 A1* | 6/2019 | Abari | G06Q 10/02 |
| 2019/0213808 A1 | 7/2019 | Bellrose | |
| 2019/0347582 A1* | 11/2019 | Allen | G06Q 10/02 |
| 2020/0023846 A1* | 1/2020 | Husain | H04W 4/44 |
| 2021/0192405 A1* | 6/2021 | Bristow | G08G 5/0069 |

FOREIGN PATENT DOCUMENTS

| | | |
|---|---|---|
| CN | 106096836 A | 11/2016 |
| CN | 110019108 A | 7/2019 |
| WO | 2016089792 A1 | 6/2016 |
| WO | WO-2022072522 A1 * | 4/2022 |

OTHER PUBLICATIONS

Ducros, F., & Pamphile, P. (2019). Maintenance cost forecasting for a fleet of vehicles. (Year: 2019).*

Predictive Maintenance for Automotive, Pitstop (Techstars Mobility'15), https://angel.co/company/pitstop.

* cited by examiner

ASSET HEALTH MANAGEMENT FOR VEHICLES

CROSS-RELATED APPLICATIONS

This application claims priority of Indian Non-Provisional Application No. 202041044112, filed Oct. 9, 2020, the contents of which are incorporated herein by reference.

FIELD

Various embodiments of the disclosure relate generally to vehicle maintenance. More specifically, various embodiments of the disclosure relate to methods and systems for asset health management for vehicles.

BACKGROUND

Typically, transport aggregators maintain a fleet of vehicles, each having a different configuration, health condition, utilization, or the like. In addition, each vehicle in the fleet may be associated with different drivers and may exhibit different physical and technical parameters. Therefore, it becomes important for a transport aggregator to regularly monitor asset health of the vehicles for building maintenance and replacement strategies.

Presently, the asset health of each vehicle is determined based on a net profit value (NPV) associated therewith. The NPV associated with a vehicle is determined based on a difference between an expense and an income associated with the vehicle. Further, the NPV of the vehicle is determined manually, which requires human intervention. The manual determination of the NPV is time and cost consuming. Since the known solution for determining the NPV is based on monitoring monetary outflow and inflow associated with the vehicle, various physical, technical, and environmental parameters associated with the vehicle are overlooked.

In light of the foregoing, there exists a need for a technical and reliable solution that overcomes the abovementioned problems, and ensures efficient asset health management for vehicles.

SUMMARY

Methods for asset health management are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1A:
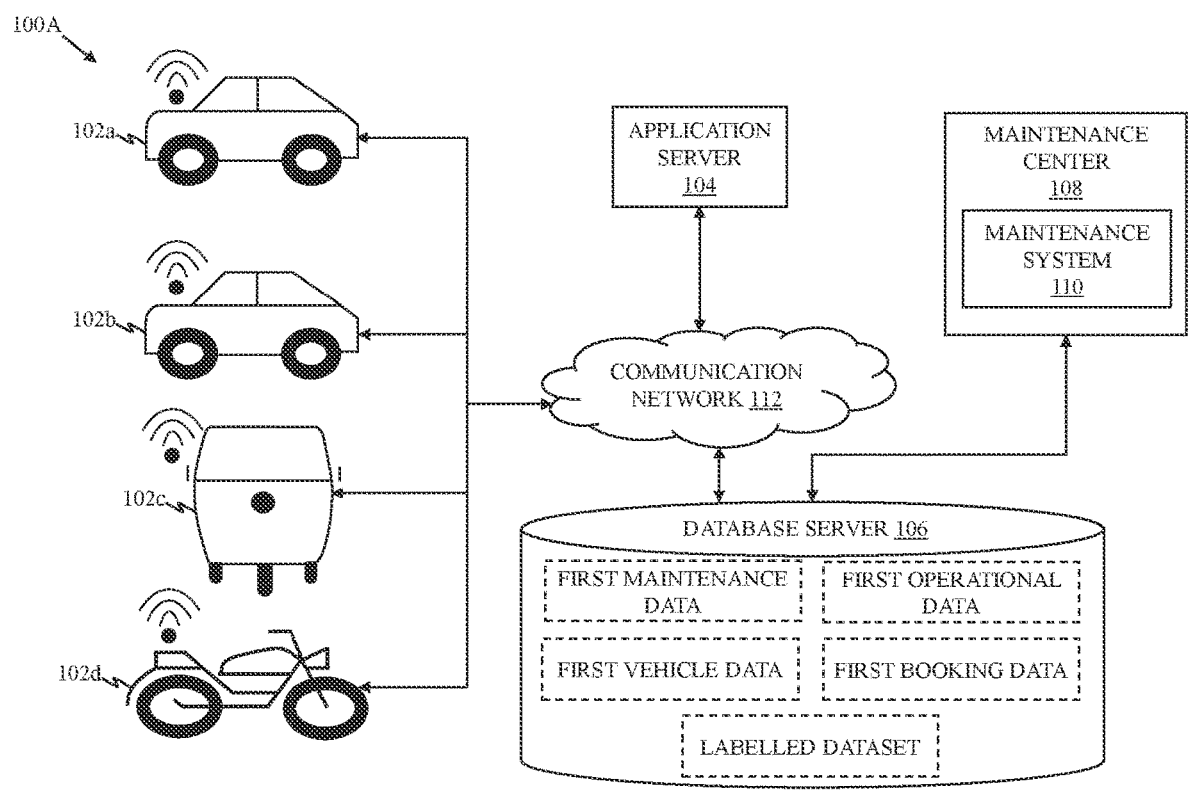
FIG. 1A is a block diagram that illustrates a system environment for asset health management, in accordance with an exemplary embodiment of the disclosure.

Certain embodiments of the disclosure may be found in the disclosed systems and methods for asset health management. Exemplary aspects of the disclosure provide methods for asset health management for vehicles. The methods include various operations that are executed by a server (for example, an application server) to determine a health index of an asset (for example, a vehicle). In an embodiment, the server is configured to receive first maintenance data, first booking data, first vehicle data, first operational data, and a labelled dataset for a set of vehicles. The first maintenance data, the first booking data, the first vehicle data, and the first operational data are received over a first time-interval. The labelled dataset includes at least an actual health index observed over the first time-interval for each vehicle of the set of vehicles. The server is further configured to determine a first plurality of features and a corresponding first plurality of feature values based on the first maintenance data, the first booking data, the first vehicle data, and the first operational data. The first plurality of features include at least a forecasted cost per unit distance. The first plurality of feature values include at least a first set of cost per unit distance values forecasted over a future time-interval for one or more components of each vehicle of the set of vehicles. The server is further configured to train a first prediction model based on the first plurality of features, the first plurality of feature values, and the labelled dataset. The server is further configured to determine a health index of a target vehicle based on the trained first prediction model and a first dataset associated with the target vehicle. The first dataset includes second maintenance data, second booking data, second vehicle data, and second operational data for the target vehicle.

In an embodiment, for forecasting the first set of cost per unit distance values, the server is configured to receive third maintenance data, third vehicle data, third booking data, and time-series data for the set of vehicles. The third maintenance data, the third vehicle data, and the third booking data are associated with a second time-interval that occurs prior to the first time-interval. The time-series data includes at least a second set of cost per unit distance values observed during the second time-interval for the one or more components of each vehicle of the set of vehicles. The server is further configured to determine a second plurality of features and corresponding second plurality of feature values based on the third maintenance data, the third vehicle data, and the third booking data. The server is further configured to train a second prediction model based on the second plurality of features, the second plurality of feature values, and the time-series data. The server is further configured to forecast, over the future time-interval, the first set of cost per unit distance values based on the trained second prediction model, the first maintenance data, the first booking data, and the first vehicle data.

In an embodiment, the first plurality of features further include at least one of a vehicle make, a vehicle model, a region of operation of a vehicle, an age of a vehicle, an active age of a vehicle, a dormant age of a vehicle, a repair downtime of a vehicle, an active duration of a vehicle, and a dormant duration of a vehicle.

In another embodiment, the first plurality of features further include at least one of a total distance travelled by a vehicle, a count of unique drivers associated with a vehicle, an average distance travelled between consecutive failures of a vehicle, an average distance travelled between consecutive accidents of a vehicle, and an average distance travelled between consecutive refurbishments of a vehicle.

In another embodiment, the first plurality of features further include at least one of an absolute deviation from a scheduled maintenance of a vehicle, a count of scheduled maintenances of a vehicle, a count of non-scheduled maintenances of a vehicle, a count of accidents of a vehicle, and an average repair time for a vehicle.

In another embodiment, the first plurality of features further include at least one of a dry run distance travelled by a vehicle, a trip distance travelled by a vehicle, an excess distance travelled by a vehicle, a count of bookings per day for a vehicle, and a distance travelled per day by a vehicle.

In an embodiment, the server is further configured to select one of a plurality of outcomes for the target vehicle based on the determined health index of the target vehicle. The plurality of outcomes include at least one of a refurbishment of the target vehicle, an off-roading of the target vehicle, an onboarding of the target vehicle, selling of the target vehicle, and buying of the target vehicle.

The methods and systems of the disclosure provide a solution for asset health management for vehicles. The methods and systems allow for determination of an asset health index for a vehicle based on various parameters affecting the profitability of the vehicle. The disclosed methods and systems also allow for uninterrupted monitoring of a vehicle's health that is indicative of its profitability towards its owner. Therefore, the performance and profitability of the vehicle remain optimal while it runs on road. Further, the disclosed methods and systems substantially reduce human intervention for determining the asset health index of the vehicle. The disclosed methods and systems also utilize forecasted cost per unit distance values associated with one or more components of the vehicle for determining the asset health index. Leveraging the forecasted cost per unit distance values for the determination of the asset health index allows efficient and timely detection of abnormal conditions within the vehicle, resulting in minimum unforeseen downtime for the vehicle.

FIG. 1A is a block diagram that illustrates a system environment 100A for asset health management, in accordance with an exemplary embodiment of the disclosure. The system environment 100A includes a set of vehicles 102a-102d, an application server 104, a database server 106, a maintenance center 108 having a maintenance system 110, and a communication network 112. Examples of the communication network 112 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the set of vehicles 102a-102d, the application server 104, the database server 106, and the maintenance system 110) in the system environment 100A may be communicatively coupled to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof. In one example, the set of vehicles 102a-102d may be communicatively coupled to the communication network 112 via one of corresponding telematics devices, corresponding on-board diagnostics devices (OBDs), corresponding driver devices, or a connected car network handled by a third-party server.

Each vehicle 102a-102d is a mode of transport and may include suitable logic, circuitry, interfaces and/or code, executable by the circuitry, that may be configured to control and perform one or more operations with or without a driving assistance. The set of vehicles 102a-102d may be referred to as assets. In an embodiment, the set of vehicles 102a-102d may be associated with a transportation service provider (e.g., a cab service provider, an on-demand transportation service provider, or the like) to cater to travelling requirements of various passengers. Examples of the set of vehicles 102a-102d may include, but are not limited to, an automobile, a bus, a car, an auto rickshaw, and a bike. For the sake of brevity, the set of vehicles 102a-102d are shown to include two four-wheeler vehicles 102a and 102b, a three-wheeler vehicle 102c, and a two-wheeler vehicle 102d. The set of vehicles 102a-102d may have different configurations and may have been exposed to different environmental, physical, and driving conditions. As a result, the set of vehicles 102a-102d may have different health and performance statistics, and hence may exhibit different utilization and profitability factors. A health index of an asset (i.e., a vehicle) is a collective indicator of a performance, a health, a utilization, and a profitability of the asset. The health index may be a grade, a percentage, a score, or the like provided to a vehicle based on the performance, the health, the utilization, and the profitability of the vehicle. Throughout the disclosure the terms "health index" and "asset health index" are used interchangeably.

The maintenance center 108 is an entity (for example, a place, an organization, or the like) that provides a platform for physical inspection of one or more components and the performance of each vehicle 102a-102d. The set of vehicles 102a-102d may be examined at the maintenance center 108 on a regular basis such as weekly, monthly, annually, or as mandated by corresponding vehicle manufacturers. The maintenance center 108 may include the maintenance system 110. The maintenance system 110 may include suitable logic, circuitry, interfaces, and/or code, that may be configured to control and execute one or more operations for performing troubleshooting and maintenance of the one or more components of the set of vehicles 102a-102d. The maintenance system 110 may be configured to collect maintenance data (such as service and repair data) of each vehicle 102a-102d over a first time-interval. The maintenance system 110 may be further configured to perform operations for storing the maintenance data associated with the set of vehicles 102a-102d in the database server 106. The maintenance data may indicate one or more parameters associated with repair and maintenance of each vehicle 102a-102d. The maintenance data may include information pertaining to absolute deviation from scheduled maintenances of each vehicle 102a-102d, a count of the scheduled maintenances of each vehicle 102a-102d, a count of non-scheduled maintenances of each vehicle 102a-102d, a count of accidents of each vehicle 102a-102d, and an average repair time for each vehicle 102a-102d. The maintenance data collected over the first time-interval for the set of vehicles 102a-102d is hereinafter referred to as "first maintenance data".

The database server 106 may include suitable logic, circuitry, interfaces, and/or code, executable by the circuitry, that may be configured to perform one or more operations for collecting and storing the first maintenance data, first booking data, first vehicle data, first operational data, and a labelled dataset associated with the set of vehicles 102a-102d. The database server 106 may collect the first maintenance data, the first booking data, the first vehicle data, the first operational data, and the labelled dataset associated with the set of vehicles 102a-102d, over the first time-interval, from each vehicle 102a-102d and the maintenance system 110. Examples of the database server 106 may include a cloud-based database, a local database, a distributed database, a database management system (DBMS), or the like.

Figure 2A:
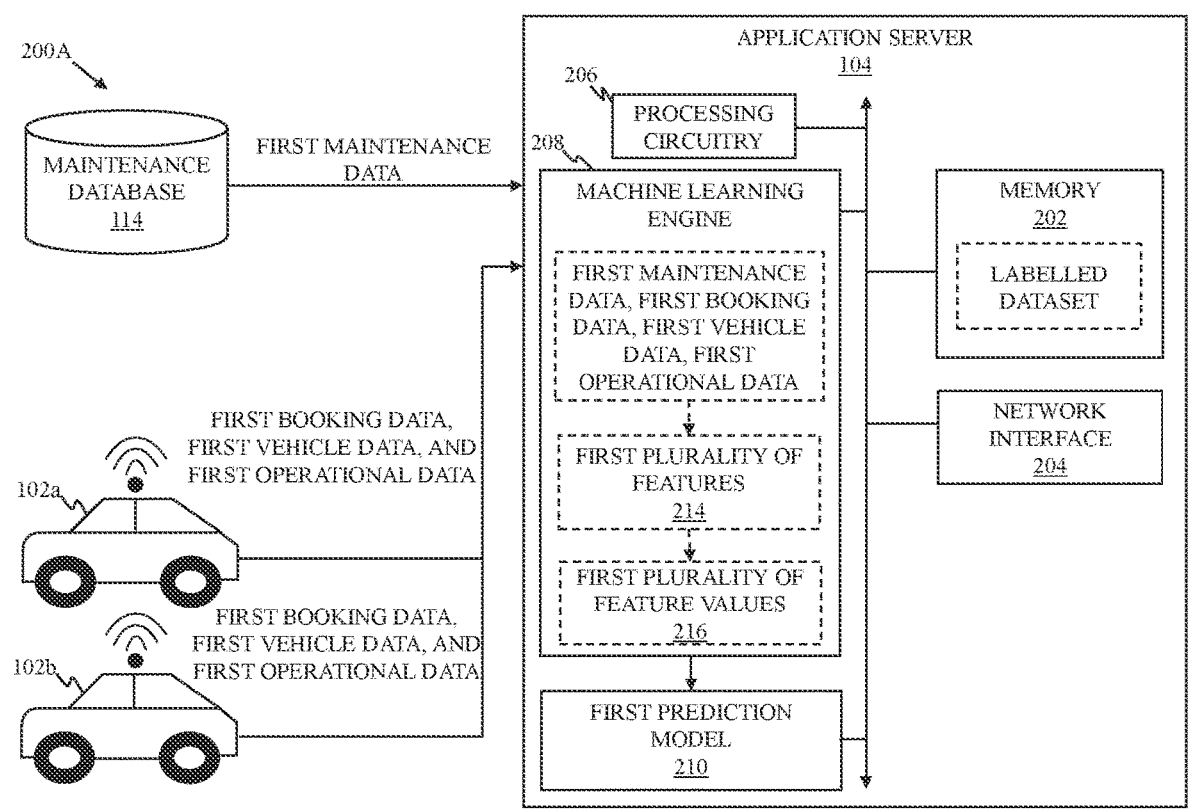
FIG. 2A is a schematic diagram that illustrates an exemplary scenario for training a first prediction model for asset health index determination, in accordance with an exemplary embodiment of the disclosure.
Figure 2B:
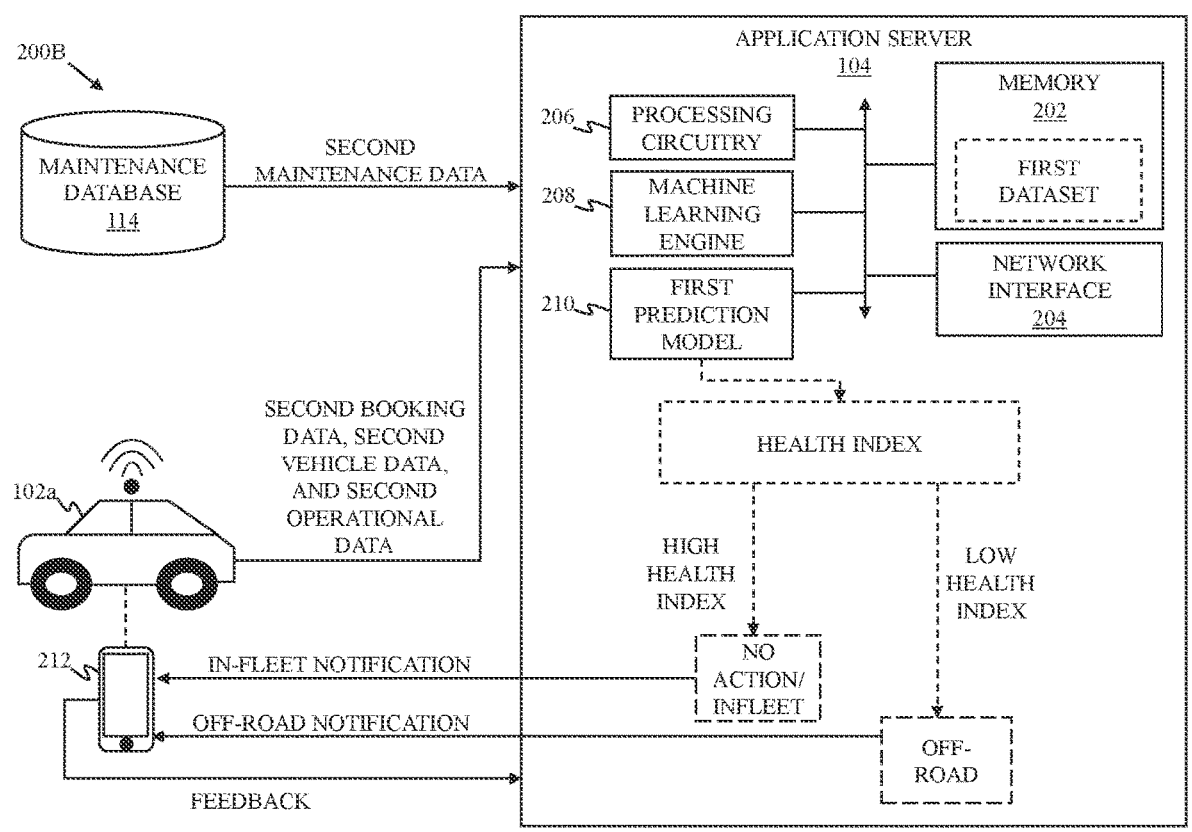
FIG. 2B is a schematic diagram that illustrates an exemplary scenario for determining an asset health index of a vehicle, in accordance with an exemplary embodiment of the disclosure.

Booking data of a vehicle includes various parameters that indicate day-to-day operations of the vehicle for catering to travel demand of passengers. For example, the booking data of each vehicle 102a-102d may include information pertaining to a dry run distance travelled by corresponding vehicle 102a-102d, a trip distance travelled by the corresponding vehicle 102a-102d, an excess distance travelled by the corresponding vehicle 102a-102d, a count of bookings per day for the corresponding vehicle 102a-102d, and a distance travelled per day by the corresponding vehicle 102a-102d. In one embodiment, the database server 106 may receive real-time booking data from a driver device (as shown in FIG. 2B) associated with each vehicle 102a-102d. The booking data of the set of vehicles 102a-102d collected over the first time-interval is collectively referred to as the first booking data. Examples of the driver device may include a cell-phone, a laptop, a tablet, a phablet, or the like. In another embodiment, the database server 106 may receive the first booking data from the transportation service provider associated with the set of vehicles 102a-102d.

Vehicle data of a vehicle includes various parameters which are specific to the vehicle. For example, the vehicle data of each vehicle 102a-102d may include information pertaining to a make of the corresponding vehicle 102a-102d, a model of the corresponding vehicle 102a-102d, a region of operation of the corresponding vehicle 102a-102d, an age of the corresponding vehicle 102a-102d, an active age of the corresponding vehicle 102a-102d, a dormant age of the corresponding vehicle 102a-102d, a repair downtime of the corresponding vehicle 102a-102d, an active duration of the corresponding vehicle 102a-102d, and a dormant duration of the corresponding vehicle 102a-102d. In one embodiment, the database server 106 may receive the vehicle data from a corresponding driver device (as shown in FIG. 2B), the telematics device, or the OBD device associated with each vehicle 102a-102d. The vehicle data of the set of vehicles 102a-102d collected over the first time-interval is collectively referred to as the first vehicle data. In another embodiment, the database server 106 may receive the first vehicle data from the transportation service provider associated with the set of vehicles 102a-102d.

Operational data includes various parameters that indicate on-road operations of the vehicle. The operational data of each vehicle 102a-102d may include information pertaining to a total distance travelled by the corresponding vehicle 102a-102d, a count of unique drivers associated with the corresponding vehicle 102a-102d, an average distance travelled between consecutive failures of the corresponding vehicle 102a-102d, an average distance travelled between consecutive accidents of the corresponding vehicle 102a-102d, and an average distance travelled between consecutive refurbishments of the corresponding vehicle 102a-102d. The operational data of the set of vehicles 102a-102d collected over the first time-interval is collectively referred to as the first operational data. In another embodiment, the database server 106 may receive the first operational data from the transportation service provider associated with the set of vehicles 102a-102d.

The labelled dataset includes an actual health index (i.e., actual asset health index) observed over the first time-interval for each vehicle 102a-102d. An actual health index refers to a score or a grade that is indicative of an actual asset health of each vehicle 102a-102d during the first time-interval. Examples of the first time-interval may be one week, two weeks, one month, two months, one year, or the like. In a non-limiting example, it is assumed that the first time-interval may be "Jan. 1, 2019-Dec. 31, 2019", i.e., 365 days or 1 year. In such a scenario, the labelled dataset includes the actual health index (i.e., actual asset health index) observed over the year 2019 for each vehicle 102a-102d. In an embodiment, the database server 106 may receive the labelled dataset from one of the transportation service provider associated with the set of vehicles 102a-102d, the maintenance system 110, and the database server 106.

The application server 104 may include suitable logic, circuitry, interfaces, and/or code, executable by the circuitry, that may be configured to perform one or more operations for determining health indices of vehicles (for example, any of the set of vehicles 102a-102d or other vehicles). The application server 104 may be configured to communicate with the database server 106, the maintenance system 110, and the driver devices associated with the set of vehicles 102a-102d via the communication network 112. Examples of the application server 104 may include a cloud-based server, a local server, a group of centralized servers, a group of distributed servers, or the like. The application server 104 may be configured to operate in two phases such as a training phase and an implementation phase. The application server 104 may operate in the training phase for training a first prediction model (as shown in FIG. 2A) for health index determination. In the training phase, the application server 104 may further train a second prediction model (shown in FIG. 3A) for forecasting cost per unit distance values for one or more vehicle components. After the first and second prediction models are trained, the application server 104 may operate in the implementation phase.

During the training phase, the application server 104 may be configured to receive the first maintenance data, the first booking data, the first vehicle data, the first operational data, and the labelled dataset for the set of vehicles 102a-102d. The first maintenance data, the first booking data, the first vehicle data, and the first operational data are received/collected over the first time-interval. The application server 104 may be further configured to determine a first plurality of features and a corresponding first plurality of feature values based on the first maintenance data, the first booking data, the first vehicle data, and the first operational data. The application server 104 may be further configured to train the first prediction model based on the first plurality of features, the first plurality of feature values, and the labelled dataset. The processes of determining the first plurality of features and the corresponding first plurality of feature values and training the first prediction model are described in detail in conjunction with FIG. 2A.

In an embodiment, the first plurality of features may include a forecasted cost per unit distance for a vehicle. In such a scenario, the first plurality of feature values may include a first set of cost per unit distance values forecasted over a future first time-interval for one or more components of each vehicle 102a-102d. The first set of cost per unit distance values are forecasted by the second prediction model. The future time-interval may refer to a time-period, that occurs after the first time-interval, for which the first set of cost per unit distance values for the one or more components is forecasted. In one example, the future time-interval may be "Jan. 1-Dec. 31, 2020", i.e., 12 months. In such a scenario, the first set of cost per unit distance values are forecasted over "12 months of the year 2020" for one or more components of each vehicle 102a-102d.

In an embodiment, the first plurality of features may further include a vehicle make, a vehicle model, a region of operation of a vehicle, an age of a vehicle, an active age of a vehicle, a dormant age of a vehicle, a repair downtime of a vehicle, an active duration of a vehicle, and a dormant duration of a vehicle. In such an embodiment, the first plurality of feature values may further include the make of each vehicle 102a-102d, the model of each vehicle 102a-102d, the region of operation of each vehicle 102a-102d, the age of each vehicle 102a-102d, the active age of each vehicle 102a-102d, the dormant age of each vehicle 102a-102d, the repair downtime of each vehicle 102a-102d, the active duration of each vehicle 102a-102d during the first time-interval, and the dormant duration of each vehicle 102a-102d during the first time-interval.

In another embodiment, the first plurality of features may further include a total distance travelled by a vehicle, a count of unique drivers associated with a vehicle, an average distance travelled between consecutive failures of a vehicle, an average distance travelled between consecutive accidents of a vehicle, and an average distance travelled between consecutive refurbishments of a vehicle. In such an embodiment, the first plurality of feature values may further include the total distance travelled by each vehicle 102a-102d, the count of unique drivers associated with each vehicle 102a-102d, the average distance travelled between consecutive failures of each vehicle 102a-102d, the average distance travelled between consecutive accidents of each vehicle 102a-102d, and the average distance travelled between consecutive refurbishments of each vehicle 102a-102d.

In another embodiment, the first plurality of features may further include an absolute deviation from a scheduled maintenance of a vehicle, a count of scheduled maintenances of a vehicle, a count of non-scheduled maintenances of a vehicle, a count of accidents of a vehicle, and an average repair time for a vehicle. In such an embodiment, the first plurality of feature values may further include the absolute deviation from the scheduled maintenance of each vehicle 102a-102d, the count of the scheduled maintenances of each vehicle 102a-102d, the count of non-scheduled maintenances of each vehicle 102a-102d, the count of accidents of each vehicle 102a-102d, and the average repair time for each vehicle 102a-102d.

In another embodiment, the first plurality of features may further include a dry run distance travelled by a vehicle, a trip distance travelled by a vehicle, an excess distance travelled by a vehicle, a count of bookings per day for a vehicle, and a distance travelled per day by a vehicle. In such an embodiment, the first plurality of feature values may further include the dry run distance travelled by each vehicle 102a-102d, the trip distance travelled by each vehicle 102a-102d, the excess distance travelled by each vehicle 102a-102d, the count of bookings per day for each vehicle 102a-102d, and the distance travelled per day by each vehicle 102a-102d.

During the implementation phase, the application server 104 may be further configured to receive a first dataset associated with a target vehicle from one of the database server 106, the driver device, and the transportation service provider associated with the target vehicle. In an embodiment, the target vehicle may be one of the set of vehicles 102a-102d. In another embodiment, the target vehicle may be different from the set of vehicles 102a-102d. For the sake of brevity, it is assumed that the target vehicle may be the vehicle 102a. The first dataset may include second maintenance data, second booking data, second vehicle data, and second operational data for the vehicle 102a. In one embodiment, the application server 104 may be configured to receive a portion of the first dataset from the driver device (shown in FIG. 2B) associated the vehicle 102a. For example, the application server 104 may be configured to receive the second booking data from the driver device associated with the vehicle 102a. In another example, the application server 104 may be configured to receive the second vehicle data from the driver device associated with the vehicle 102a.

The second maintenance data may include information pertaining to the absolute deviation from the scheduled maintenances of the vehicle 102a, the count of scheduled maintenances of the vehicle 102a, the count of non-scheduled maintenances of the vehicle 102a, the count of accidents of the vehicle 102a, and the average repair time for the vehicle 102a. The second booking data may include information pertaining to the dry run distance travelled by the vehicle 102a, the trip distance travelled by the vehicle 102a, the excess distance travelled by the vehicle 102a, the count of bookings per day for the vehicle 102a, and the distance travelled per day by the vehicle 102a. The second vehicle data may include information pertaining to the make of the vehicle 102a, the model of the vehicle 102a, the region of operation of the vehicle 102a, the age of the vehicle 102a, the active age of the vehicle 102a, the dormant age of the vehicle 102a, the repair downtime of the vehicle 102a, the active duration of the vehicle 102a, and the dormant duration of the vehicle 102a. In an embodiment, the active duration of the vehicle 102a and the dormant duration of the vehicle 102a may be associated with a time-interval for which the health index for the vehicle 102a is being determined. The second operational data may include information pertaining to the total distance travelled by the vehicle 102a, the count of unique drivers associated with the vehicle 102a, the average distance travelled between consecutive failures of the vehicle 102a, the average distance travelled between consecutive accidents of the vehicle 102a, and the average distance travelled between consecutive refurbishments of the vehicle 102a.

The application server 104 may be configured to provide the first dataset as an input to the trained first prediction model to determine the health index of the vehicle 102a. The application server 104 may be configured to determine the health index of the vehicle 102a based on an output of the trained first prediction model. The health index of the vehicle 102a may be indicative of the health, the performance, the utilization, and the profitability of the vehicle 102a at the time-interval for which the health index is determined. The application server 104 may be further configured to select, based on the determined health index of the vehicle 102a, one of a plurality of outcomes for the vehicle 102a. The plurality of outcomes may include a refurbishment of the vehicle 102a, an off-roading of the vehicle 102a, an onboarding of the vehicle 102a, selling of the vehicle 102a, and buying of the vehicle 102a. For example, the application server 104 may select to off-road the vehicle 102a for having a low health index and onboard another vehicle for having a high health index. Various components of the application server 104 and operations performed by the application server 104 are explained in detail in conjunction with FIGS. 2A and 2B.

Since an output of the second prediction model (i.e., the first set of cost per unit distance values) is used as an input for training the first prediction model, during the training phase, the application server 104 may be further configured to train the second prediction model prior to training the first prediction model. For training the second prediction model, the application server 104 may be configured to receive third maintenance data, third vehicle data, third booking data, and time-series data for the set of vehicles 102a-102d. The third maintenance data, the third vehicle data, and the third booking data are associated with a second time-interval that is prior to the first time-interval. For example, when the first time-interval is Jan. 1, 2019-Dec. 31, 2019, the second time-interval may be Jan. 1-Dec. 31, 2018. For example, the maintenance data, the vehicle data, and the booking data collected over the second time-interval are termed as the third maintenance data, the third vehicle data and the third booking data, respectively. In other words, the third maintenance data, the third vehicle data, and the third booking data are older than the first maintenance data, the first vehicle data, and the first booking data. The time-series data includes a second set of cost per unit distance values observed during the second time-interval for the one or more components of each vehicle 102a-102d. The time-series data may include actual cost per unit distance values associated with the one or more components of each vehicle 102a-102d at a plurality of time-instances during the second time-interval. For example, the plurality of time-instances during the second time-interval may be T−1, T−2, T−3, and T−4. In one example, the plurality of time-instances may be consecutive time-instances (e.g., consecutive days, consecutive weeks, consecutive months, or the like) within the second time-interval. Thus, the time-series data includes the second set of cost per unit distance values for the one or more components of each vehicle 102a-102d at the plurality of time-instances T−1, T−2, T−3, and T−4. The application server 104 may be further configured to determine a second plurality of features and a corresponding second plurality of feature values based on the third maintenance data, the third vehicle data, and the third booking data. The application server 104 may be further configured to train the second prediction model based on the second plurality of features, the second plurality of feature values, and the time-series data. By using the trained second prediction model, the application server 104 may be configured to forecast cost per unit distance values for one or more vehicle components of any vehicle. Thus, the application server 104 obtains the first set of cost per unit distance values for the set of vehicles 102a-102d by providing the first maintenance data, the first booking data, and the first vehicle data as input to the trained second prediction model.

Figure 1B:
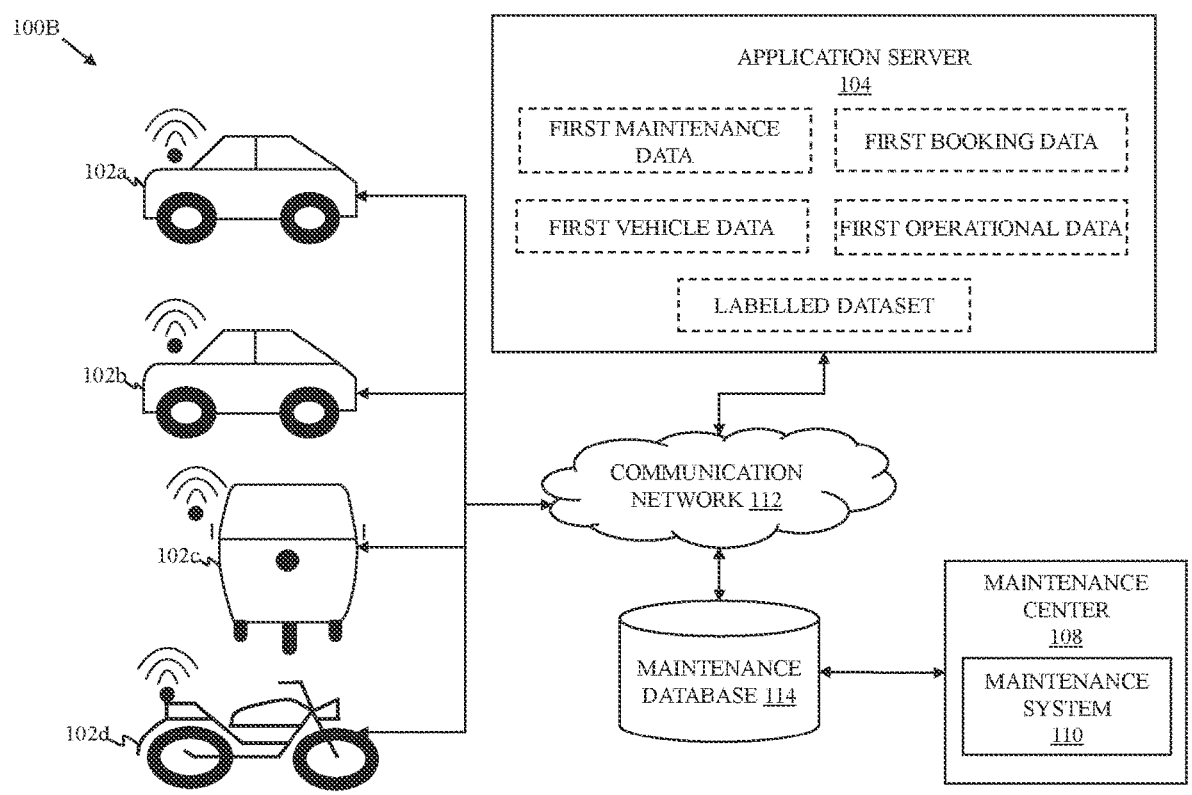
FIG. 1B is another block diagram that illustrates another system environment for asset health management, in accordance with an exemplary embodiment of the disclosure.

FIG. 1B is a block diagram that illustrates another system environment 100B for asset health management, in accordance with an exemplary embodiment of the disclosure. The system environment 100B includes the set of vehicles 102a-102d, the application server 104, the database server 106, the maintenance center 108 having the maintenance system 110, the communication network 112, and the maintenance database 114.

The maintenance database 114 may include suitable logic, circuitry, interfaces, and/or code, executable by the circuitry, that may be configured to store the maintenance data associated with the set of vehicles 102a-102d. The maintenance database 114 may receive the first maintenance data from the maintenance system 110. The maintenance database 114 may receive the first maintenance data periodically or in real-time or near real-time. The maintenance database 114 may be configured to communicate with the maintenance system 110 via the communication network 112.

In another embodiment, instead of the database server 106 (as shown in FIG. 1A), the application server 104 may be configured to collect the first maintenance data, the first booking data, the first vehicle data, the first operational data and the labelled dataset, from one of each vehicle 102a-102d, the maintenance system 110, the maintenance database 114, and the transportation service provider associated with the set of vehicles 102a-102d.

FIG. 2A is a schematic diagram that illustrates an exemplary scenario 200A for training the first prediction model for asset health index determination, in accordance with an exemplary embodiment of the disclosure. For the sake of brevity, the first prediction model is shown to be trained based on data associated with the vehicles 102a and 102b. The application server 104 may include a memory 202, a network interface 204, processing circuitry 206, a machine learning engine 208, and the first prediction model (hereinafter, referred to and designated as "the first prediction model 210").

The memory 202 may include suitable logic, circuitry, and interfaces that may be configured to store one or more instructions which when executed by the processing circuitry 206 cause the processing circuitry 206 to perform various operations for asset health index determination. The memory 202 may be configured to store the first maintenance data, the first booking data, the first vehicle data, the first operational data, and the labelled dataset associated with the vehicles 102a and 102b. The memory 202 may be accessible by the processing circuitry 206, the machine learning engine 208, and the first prediction model 210. Examples of the memory 202 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 202 in the application server 104, as described herein. In another embodiment, the memory 202 may be realized in the form of a database or a cloud storage working in conjunction with the application server 104, without departing from the scope of the disclosure.

The network interface 204 may include suitable logic, circuitry, interfaces, and/or code, executable by the circuitry, that may be configured to enable the application server 104 to communicate with the database server 106, the maintenance database 114 (shown in FIG. 1B), and driver devices of each vehicle 102a and 102b. The network interface 204 may be implemented as a hardware, software, firmware, or a combination thereof. Examples of the network interface 204 may include a network interface card, a physical port, a network interface device, an antenna, a radio frequency transceiver, a wireless transceiver, an Ethernet port, a universal serial bus (USB) port, or the like.

The processing circuitry 206 may include suitable logic, circuitry, interfaces, and/or code, executable by the circuitry, that may be configured to execute the instructions stored in the memory 202 to perform various operations for asset health index determination. The processing circuitry 206 may be configured to perform various operations associated with data collection and data processing. The processing circuitry 206 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 206 may be compatible with multiple operating systems.

When the application server 104 is operating in the training phase, the processing circuitry 206 may be configured to receive, from the database server 106, the first maintenance data, the first booking data, the first vehicle data, the first operational data, and the labelled dataset associated with the vehicles 102a and 102b. The processing circuitry 206 may be further configured to store the received first maintenance data, the first booking data, the first vehicle data, the first operational data, and the labelled dataset in the memory 202 or a cloud database server (not shown).

In one embodiment, the database server 106 is configured to collect the first maintenance data, the first booking data, the first vehicle data, and the first operational data, over the first time-interval, and the labelled dataset from one of the driver device of each vehicle 102a and 102b, the maintenance system 110, and the maintenance database 114. In one example, the driver device of each vehicle 102a and 102b may correspond to a telematics device (not shown) or an OBD device (not shown). The collection of the first maintenance data, the first booking data, the first vehicle data, the first operational data, and the labelled dataset has been described in the foregoing description of FIGS. 1A and 1B.

The processing circuitry 206 may be further configured to cause the machine learning engine 208 to analyze and process the collected first maintenance data, the first booking data, the first vehicle data, the first operational data and the labelled dataset, and obtain the first plurality of features (hereinafter, referred to and designated as the first plurality of features 214").

The machine learning engine 208 may include suitable logic, circuitry, interfaces, and/or code, executable by the circuitry, that may be configured to perform one or more operations for determining asset health indices. Examples of the machine learning engine 208 may include, but are not limited to, an ASIC processor, a RISC processor, a CISC processor, and an FPGA processor. The machine learning engine 208 may also correspond to a CPU, a GPU, an NPU, a DSP, or the like. It will be apparent to a person of ordinary skill in the art that the machine learning engine 208 may be compatible with multiple operating systems. Further, the machine learning engine 208 may include a machine-learning model that implements any suitable machine-learning techniques, statistical techniques, or probabilistic techniques for performing the one or more operations associated with the training of the first prediction model 210.

When the application server 104 is operating in the training phase, the machine learning engine 208 may be configured to process and analyze the first maintenance data, the first booking data, the first vehicle data, the first operational data, and the labelled dataset stored in the memory 202. The machine learning engine 208 may use various feature or variable selection techniques to analyze the first maintenance data, the first booking data, the first vehicle data, the first operational data, and the labelled dataset. The machine learning engine 208 may determine the first plurality of features 214 that are direct or indirect indicators of asset health or asset valuation, based on the first maintenance data, the first booking data, the first vehicle data, the first operational data, and the labelled dataset. For example, the machine learning engine 208 may determine that a cost per unit distance incurred on an engine of a vehicle, a distance travelled by a vehicle between consecutive refurbishments, and a count of non-scheduled maintenances of a vehicle are indicators of a good or bad asset health. In another example, the machine learning engine 208 may determine that a count of accidents of a vehicle has direct causal relationship with good or bad asset health.

Based on the first maintenance data, the first booking data, the first vehicle data, and the first operational data, the machine learning engine 208 may be further configured to determine the first plurality of feature values corresponding to the first plurality of features 214. Hereinafter, the first plurality of feature values are referred to and designated as "the first plurality of features values 216". The first plurality of feature values 216 may include numerical values, alphabetical values, grades, or the like associated with the corresponding first plurality of features 214. For example, a feature may be a total distance travelled by a vehicle. Therefore, the feature value may be 2,000 kilometers as indicated by an odometer reading of the vehicle. The first plurality of feature values 216 may provide a historical pattern of the health, performance, and utilization of each vehicle 102a and 102b.

The first plurality of features 214 determined by the machine learning engine 208 may include forecasted cost per unit distance of one or more components of a vehicle. The forecasted cost per unit distance may refer to a cost that is projected to be incurred on each of the one or more components of the vehicle during the future time-interval. Examples of the future time-interval may include one day, one week, two weeks, one month, one year, or the like after the first time-interval. The forecasted cost per unit distance for the one or more components may further indicate a projected cost that the transportation service provider may be required to bear for keeping the vehicle operational during the future time-interval. For example, a high cost per unit distance incurred on one or more components of the vehicle may indicate that the vehicle is prone to cause monetary loss to the transportation service provider. In one example, the forecasted cost per unit distance may correspond to forecasted cost per kilometre for the one or more components of the vehicle. The first plurality of features values 216, corresponding the forecasted cost per unit distance feature, may include the first set of cost per unit distance values forecasted over the future time-interval for the one or more components of each vehicle 102a and 102b. In one example, the first set of cost per unit distance values may include cost per kilometer values for a battery of the vehicle 102a at time-instances T+1, T+2, and T+3 during the future time-interval.

In an embodiment, the first plurality of features 214 determined by the machine learning engine 208 may further include the vehicle make, the vehicle model, the region of operation of a vehicle, the age of a vehicle, the active age of a vehicle, the dormant age of a vehicle, the repair downtime of a vehicle, the active duration of a vehicle, and the dormant duration of a vehicle.

The active age of a vehicle refers to a time-interval for which the vehicle has been put to use in the entire life span of the vehicle. For example, the vehicle 102a may have been manufactured on Jul. 20, 2010 and put to use on Jul. 20, 2012. Thus, on Jul. 20, 2014, the active age of the vehicle 102a is two years whereas the actual age of the vehicle 102a is four years. Further, the active age of the vehicle indicates a time-interval during which the one or more components of the vehicle have been active. The active age of the vehicle may have a high impact on the health index of the vehicle as the one or more components may have been utilized to its full capacity during the active age.

The dormant age of a vehicle refers to a time-interval for which the vehicle has been out of use in the entire life span of the vehicle. For example, the vehicle 102a may have been manufactured on Jul. 20, 2010 and put to use on Jul. 20, 2013. Thus, on Jul. 20, 2014, the dormant age of the vehicle 102a is three years whereas the actual age of the vehicle 102a is four years. Further, the dormant age of the vehicle is an indicative of a time-interval during which the one or more components of the vehicle have been resting. The dormant age of the vehicle may indicate a probable damage caused to the vehicle and the components due to prolonged period of rest. In one example, a long dormant period may cause rusting of the one or more components of the vehicle.

The repair downtime of a vehicle refers to a time-interval for which the vehicle has been out of service due to repair and maintenance actions. For example, the vehicle 102a may have been put to use on Jul. 20, 2011. Further, on Jul. 20, 2012, the vehicle 102a is brought to the maintenance center 108 for maintenance and repair. The vehicle 102a is again put to use on Aug. 20, 2012. Thus, the repair downtime of the vehicle 102a is one month. The repair downtime may be indicative of one of a frequency of occurrence of one or more performance issues associated with the vehicle and a time spent on repair and maintenance of the vehicle.

The active duration of a vehicle refers to a time-period for which the vehicle has been on the road. In an embodiment, the active duration of the vehicles 102a and 102b may refer to a time duration for which the vehicle was put to use during the first time-interval. For example, the first time-interval may be Aug. 20, 2019 to Sep. 20, 2019 (i.e., 32 days). The vehicle 102a may have been put to use for 8 hours per day during the first time-interval. Therefore, the active duration may be equal to 256 hours (i.e., 8*32=256). Taking into account the active duration of the vehicle during the first time-interval ensures that the first prediction model 210 considers a recent working status of a vehicle while determining its corresponding asset health index.

The dormant duration of a vehicle refers to a time-period during which the vehicle has been not in use. In an embodiment, the dormant duration of the vehicles 102a and 102b may refer to a time duration for which the vehicle was not operational during the first time-interval. For example, the first time-interval may be Aug. 20, 2019 to Sep. 20, 2019. The vehicle 102a may have been inactive (i.e., resting) for 10 hours per day during the first time-interval. Therefore, the dormant duration may be equal to 320 hours (i.e., 10*32=320). Taking into account the dormant duration of the vehicle during the first time-interval ensures that the first prediction model 210 considers a recent resting status of the vehicle while determining its corresponding asset health index.

In such an embodiment, the first plurality of feature values 216 may further include vehicle makes of the vehicles 102a and 102b, the vehicle models of the vehicles 102a and 102b, the region of operations of the vehicles 102a and 102b, the ages of the vehicles 102a and 102b, the active ages of the vehicles 102a and 102b, the dormant ages of the vehicles 102a and 102b, the repair downtimes of the vehicles 102a and 102b, the active durations of the vehicles 102a and 102b during the first time-interval, and the dormant durations of the vehicles 102a and 102b during the first time-interval. By taking into account, the vehicle make, the vehicle model, the region of operation, and the vehicle age, the machine learning engine 208 ensures that training of the first prediction model 210 is normalized based on vehicle configuration and parameters affecting the health, utilization, profitability, and performance of vehicles.

In another embodiment, the first plurality of features 214 determined by the machine learning engine 208 may further include a total distance travelled by a vehicle, a count of unique drivers associated with a vehicle, an average distance travelled between consecutive failures of a vehicle, an average distance travelled between consecutive accidents of a vehicle, and an average distance travelled between consecutive refurbishments of a vehicle.

The total distance travelled by a vehicle refers to an odometer reading of the vehicle that indicates a unit distance that is travelled by the vehicle during its entire life-span. For example, an odometer reading of the vehicle 102a may be 10,000 kilometers. Therefore, the total distance travelled by the vehicle 102a may be 10,000 kilometers. The total distance travelled by the vehicle may be indicative of wear and tear caused to the vehicle.

The count of unique drivers associated with a vehicle refers to a number of drivers that have been associated with the vehicle in the entire life-span of the vehicle. For example, the vehicle 102a may be five years old and may have been driven by three drivers. Therefore, the count of unique drivers for the vehicle 102a may be three. Further, the count of drivers may affect the health and performance of the vehicle as each driver may have driven and maintained the vehicle differently. In other words, different drivers may exhibit different driving styles and behaviors that may positively or negatively impact the health, performance, profitability, and utilization of the vehicle.

The average distance travelled between consecutive failures of a vehicle refers to a ratio between a total distance travelled by the vehicle and a count of failures of the vehicle. For example, the total distance travelled by the vehicle 102a may be 20,000 kilometers and the count of failures of the vehicle 102a may be 50. Therefore, the average distance travelled between consecutive failures of the vehicle 102a may be 400 kilometers (i.e., 20,000/50=400).

The average distance travelled between consecutive accidents of a vehicle refers to a ratio between a total distance travelled by the vehicle and a count of accidents of the vehicle. In another embodiment, the average distance travelled between consecutive accidents may refer to a ratio between a total distance travelled by the vehicle after a first accident and a total count of accidents of the vehicle. For example, the total distance travelled by the vehicle 102a may be 20,000 kilometers and the count of accidents of the vehicle 102a may be 20. Therefore, the average distance travelled between consecutive accidents of the vehicle 102a may be 1,000 kilometers (i.e., 20000/20=1,000).

The average distance travelled between consecutive refurbishments of a vehicle refers to a ratio between a total distance travelled by the vehicle and a count of refurbishments of the vehicle. In another embodiment, the average distance travelled between consecutive refurbishments of the vehicle may refer to a ratio between a total distance travelled by the vehicle after a first refurbishment to a total count of refurbishments. The refurbishment of the vehicle may refer to a replacement of the one or more components of the vehicle. The refurbishment of the vehicle may be performed in an instance of a breakdown of the vehicle. Alternatively, the refurbishment of the vehicle may be performed in an instance of a suboptimal performance of the one or more components of the vehicle. For example, a battery of the vehicle 102a may exhibit a high discharge voltage. Therefore, a refurbishment of the vehicle 102a may include replacement of the battery to optimize a performance and profitability of the vehicle 102a. For example, the total distance travelled by the vehicle 102a may be 20,000 kilometers and the count of separate refurbishment incidents of the vehicle 102a may be 20. Therefore, the average distance travelled between consecutive refurbishments of the vehicle 102a may be 1,000 kilometers (i.e., 20000/20=1,000).

In such an embodiment, the first plurality of feature values 216 may further include the total distance travelled by each vehicle 102a and 102b, the count of unique drivers associated with each vehicle 102a and 102b, the average distance travelled between consecutive failures of each 102a and 102b, the average distance travelled between consecutive accidents of each vehicle 102a and 102b, and the average distance travelled between consecutive refurbishments of each vehicle 102a and 102b.

In another embodiment, the first plurality of features 214 may further include absolute deviation from scheduled maintenances of a vehicle, a count of scheduled maintenances of a vehicle, a count of non-scheduled maintenances of a vehicle, a count of accidents of a vehicle, and an average repair time for a vehicle.

The absolute deviation from a scheduled maintenance of a vehicle refers to a deviation, in terms of days, weeks, months, or years, from a planned maintenance of the vehicle. For example, a planned maintenance of the vehicle 102a may be on Jul. 10, 2019. However, the vehicle 102a may have reached the maintenance center 108 on Aug. 10, 2019 for the maintenance. Therefore, the absolute deviation from the scheduled maintenance of vehicle 102a may be one month. The absolute deviation may be indicative of careless or caring behavior of the driver towards the vehicle. A prolonged period of continuous deviation from the scheduled maintenances may be indicative of a possible deterioration of health, profitability, and performance of the vehicle.

The count of the scheduled maintenances of a vehicle refers to a number of planned maintenance appointments for the vehicle. For example, the vehicle 102a may have the vehicle age equal to two years. Further, the vehicle 102a may have a scheduled maintenance every month. Therefore, the count of scheduled maintenances may be twenty-four. The count of scheduled maintenances of the vehicle may be indicative of a cost and frequency associated with the scheduled maintenances of the vehicle. The count of the scheduled maintenances of the vehicle may be indicative of the health and performance of the vehicle.

The count of non-scheduled maintenances of a vehicle refers to a number of unplanned maintenance sessions required to keep the vehicle functioning. In an embodiment, the count of non-scheduled maintenances is indicative of a number of times the vehicle has been damaged to an extent that it had to be repaired immediately. For example, the vehicle 102a may have the vehicle age equal to two years. Further, the vehicle 102a may have a scheduled maintenance each month. A total count of maintenances of the vehicle 102a may be equal to thirty. Therefore, the count of non-scheduled maintenances may be equal to six (i.e., 30−24=6). The count of non-scheduled maintenances of the vehicle may be further indicative of an additional cost that is being borne by the transportation service provider due to poor health and additional downtime of the vehicle.

The count of accidents of a vehicle refers to a number of accidents caused to the vehicle. For example, the vehicle 102a may have suffered accidents five times during its entire life-span. Therefore, the count of accidents of the vehicle 102a may be five. The count of accidents is indicative of damages caused to the vehicle, loss caused to the transportation service provider, and a possible deterioration in health of the vehicle because of the accidents.

The average repair time for a vehicle refers to a ratio between a total time spent on repair and maintenance of the vehicle to a count of maintenance sessions of the vehicle. The average repair time for the vehicle is indicative of an average time that is spent for repair and maintenance of the vehicle at each maintenance session. For example, the vehicle 102a may have spent "120 hours" on maintenance and repair sessions. Further, a count of maintenance sessions of the vehicle 102a may be "10 hours". Therefore, the average repair time for the vehicle 102a may be "12 hours" (120/10=12).

In such an embodiment, the first plurality of feature values 216 may further include the absolute deviation from scheduled maintenances of each vehicle 102a and 102b, the count of scheduled maintenances of each vehicle 102a and 102b, the count of non-scheduled maintenances of each vehicle 102a and 102b, the count of accidents of each vehicle 102a and 102b, and the average repair time for each vehicle 102a and 102b.

In another embodiment, the first plurality of features 214 may further include a dry run distance travelled by a vehicle, a trip distance travelled by a vehicle, an excess distance travelled by a vehicle, a count of bookings per day for a vehicle, and a distance travelled per day by a vehicle. The dry run distance travelled by a vehicle refers to a distance travelled by the without having a booking. The trip distance travelled by the vehicle refers to a distance travelled by the vehicle for completing a booking. The excess distance travelled by the vehicle refers to distance travelled by the vehicle without any information to the transportation service provider. For example, a total distance travelled by the vehicle 102a may be "1,200 kilometers". The vehicle 102a may have travelled "800 kilometers" for fulfilling a plurality of bookings (i.e., trip distance). The vehicle 102a may have travelled "200 kilometers" without any booking (i.e., dry run distance). Further, the vehicle 102a may have travelled "200 kilometers" for some personal travelling of a driver associated therewith (i.e., excess distance). The count of bookings per day for the vehicle may refer to a number of booking accepted by the vehicle during a day to cater to travelling needs of one or more passengers. The distance travelled per day by the vehicle may refer to a total distance travelled by the vehicle in a day. The distance travelled per day by the vehicle may include the dry run distance travelled by the vehicle, the trip distance travelled by the vehicle, and the excess distance travelled by the vehicle.

In such an embodiment, the first plurality of feature values 216 may further include the dry run distance travelled by each vehicle 102a and 102b, the trip distance travelled by each vehicle 102a and 102b, the excess distance travelled by each vehicle 102a and 102b, the count of bookings per day for each vehicle 102a and 102b, and the distance travelled per day by each vehicle 102a and 102b, during the first time-interval.

In one embodiment, each feature of the first plurality of features 214 may be assigned a weight based on a degree of correlation between the feature and the observed asset health indices. For example, a first feature (e.g., the count of refurbishments) may be assigned a higher weight than a second feature (e.g., the count of bookings per day), based on determination by the machine learning engine 208 that the count of refurbishments is a better predictor of asset health than the count of bookings per day.

In one embodiment, the machine learning engine 208 may be configured to train the first prediction model 210 based on the first plurality of features 214, the first plurality of feature values 216, and the labelled dataset. The machine learning engine 208 may input the first plurality of features 214, the first plurality of feature values 216, and the labelled dataset to the first prediction model 210 for training. The machine learning engine 208 may train the first prediction model 210 to differentiate between a good and a bad asset health based on the first plurality of features 214, the first plurality of feature values 216, and the labelled dataset. The machine learning engine 208 may be configured to train the first prediction model 210 based on a correlation among the first plurality of features 214, the first plurality of feature values 216 and the labelled dataset. The machine learning engine 208 may further train the first prediction model 210 to determine an asset health threshold value. An asset health index greater than the asset health threshold value may be indicative of a good asset health and an asset health index less than the asset health threshold value may be indicative of a bad asset health. The first prediction model 210 may determine the asset health threshold value based on a variance in the first plurality of feature values 216 and the labelled dataset. The machine learning engine 208 may train the first prediction model 210 using one or more classification algorithms such as logistic regression classification algorithm, or the like. Examples of the first prediction model 210 may include but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier, a deep learning based classifier, or a neural network based classifier. Upon training, the first prediction model 210 may be configured to determine asset health index of a vehicle based on maintenance data, booking data, vehicle data, and operational data, associated with the vehicle.

In the current embodiment, for the sake of brevity, training data (i.e., the first plurality of features 214, the first plurality of feature values 216, and the labelled dataset) has been shown to correspond to a sample size of two (i.e., two vehicles 102a and 102b). However, in an actual implementation, the training data may correspond to a large sample size (e.g., a sample size of a thousand vehicles, ten thousand vehicles, or a million vehicles).

The machine learning engine 208 may validate an accuracy level of the trained first prediction model 210. For example, the machine learning engine 208 may provide maintenance data, booking data, vehicle data, and operational data associated with a test vehicle as input the trained first prediction model 210. The test vehicle may be identified, based on a monetary loss associated with the test vehicle, to have a bad asset health by the transportation service provider. As an output, the trained first prediction model 210 may output a health index for the test vehicle. The machine learning engine 208 may be configured to compare the output of the trained first prediction model 210 with a known health index of the test vehicle and generate a validation output, i.e., the machine learning engine 208 may check whether the trained first prediction model 210 has generated the asset health index of the test vehicle indicative of the bad asset health. The validation output may be used as a feedback to improve the accuracy level of the trained first prediction model 210.

FIG. 2B is a schematic diagram that illustrates an exemplary scenario 200B for determining a health index of a vehicle, in accordance with an exemplary embodiment of the disclosure. The application server 104 may include the memory 202, the network interface 204, the processing circuitry 206, the machine learning engine 208, and the trained first prediction model 210. For the sake of brevity, the implementation phase of the application server 104 is explained with respect to the vehicle 102a. However, the application server 104 may utilize the trained first prediction model 210 to determine the health index of any vehicle irrespective of make, model, age, or the like of the vehicle.

In the implementation phase, the application server 104 may be configured to receive, from the database server 106, the first dataset associated with the vehicle 102a. The application server 104 may be configured to receive at least a portion of the first dataset from the driver device 212 associated with the vehicle 102a. The first dataset may include second maintenance data, second booking data, second vehicle data, and second operational data associated with the vehicle 102a. In an example, the application server 104 may receive the second booking data from the driver device 212. The application server 104 may be configured to temporarily store the first dataset in the memory 202 for further processing.

In one embodiment, the processing circuitry 206 may be configured to provide the first dataset as input to the trained first prediction model 210. In another embodiment, a new plurality of feature values for the first plurality of features 214 may be determined based on the first dataset such that the new plurality of feature values are provided as input to the trained first prediction model 210. In one embodiment, the processing circuitry 206 may be configured to determine the new plurality of feature values based on the first dataset. In another embodiment, the machine learning engine 208 may be configured to determine the new plurality of feature values based on the first dataset.

As an output to the inputted new plurality of feature values, the trained first prediction model 210 may be configured to determine (or predict) the asset health index of the vehicle 102a. In one example, the asset health index determined by the trained first prediction model 210 is an absolute numerical score. In another example, the asset health index determined by the trained first prediction model 210 is a percentage score.

In an embodiment, the trained first prediction model 210 may further compare the determined asset health index with the asset health index threshold. In an instance, when the asset health index of the vehicle 102a is greater than the asset health index threshold, the trained first prediction model 210 may label the asset health index with a good asset health tag. In another instance, when the asset health index of the vehicle 102a is less than the asset health index threshold, the trained first prediction model 210 may label the asset health index with a bad asset health tag.

In another embodiment, the trained first prediction model 210 may be configured to determine, as an output to the inputted new plurality of feature values, health indices associated with the one or more components of the vehicle 102a. Further, each of the one or more components may have a corresponding weight associated therewith. The weight associated with each component may be based on an actual cost of the corresponding component, a failure pattern associated with the component, a dependency of vehicle operation on the component, or the like. The failure pattern of a component indicates a historical failure tendency of the component. For example, if a component (e.g., tires) is highly prone to failures or require frequent maintenance and repair, a low weight may be associated with the component. Similarly, a higher weight may be associated with a component (e.g., steering system) that is crucial to the operation of the vehicle as compared to another component (e.g., entertainment unit) that does not impact the operations of the vehicle. In such a scenario, the first predication model 210 may determine the health index of the vehicle 102a based on a weighted average of the health indices associated with the one or more components of the vehicle 102a.

In an embodiment, the processing circuitry 206 may be configured to receive a feedback from a driver of the vehicle 102a in the form of a voice feedback, a text feedback, or a signal feedback in response to an issue associated with the vehicle 102a. For example, a non-scheduled maintenance appointment may be requested by the driver for servicing a battery of the vehicle 102a. Further, a feedback may be provided by the driver using the driver device 212 to indicate that an excessive discharge from the battery is due to increased usage of air conditioning system of the vehicle 102a. Further, it may be specified in the feedback that the increased use of air conditioning system is due to an increased temperature in the region of operation of the vehicle 102. In such a scenario, the early or non-scheduled maintenance of the battery of the vehicle 102a due to excessive discharge may not negatively affect the health index of the vehicle 102a.

The processing circuitry 206 may be further configured to select one of the plurality of outcomes for the vehicle 102a based on the health index of the vehicle 102a. In other words, the processing circuitry 206 may select the outcome based on the output of the trained first prediction model 210. The plurality of outcomes may include a refurbishment of the vehicle 102a, an off-roading of the vehicle 102a, an onboarding of the vehicle 102a, selling of the vehicle 102a, and buying of the vehicle 102a. In an example, the processing circuitry 206 may select to refurbish the vehicle 102a based on a health index "60" of the vehicle 102a. In another example, the processing circuitry 206 may select to off-road the vehicle 102a based on a low health index "40". In an example, the processing circuitry 206 may select to sell the vehicle 102a based on a very low health index "30".

In one embodiment, the plurality of outcomes may further include incentivizing the driver of the vehicle 102a, penalizing the driver of the vehicle 102a, and swapping the vehicle 102a with another vehicle for the driver to drive. For example, the processing circuitry 206 may be configured to incentivize the driver of the vehicle 102a based on a high health index (e.g., "95") of the vehicle 102a. The processing circuitry 206 may incentive the driver in form of a bonus amount, a gift card, a discount voucher, a promotion, an extension in tenure, or the like. In another example, the processing circuitry 206 may be configured to penalize the driver of the vehicle 102a based on a low health index (e.g., "25") of the vehicle 102a. The processing circuitry 206 may penalize the driver in form of a salary deduction, a monetary loss recovery, a demotion, a deterioration in a driver rating of the driver, a tenure reduction, a tenure expiration, or the like. Beneficially, incentivizing and penalizing the driver based on the asset health index of the vehicle 102a motivates the driver to maintain a high health index of the vehicle 102a. Therefore, such incentivizing and penalizing the driver improves the performance and ensures longevity of the vehicle 102a.

In another embodiment, the driver of the vehicle 102a may exhibit one of a bad driving performance or a lack of care towards the vehicle 102a, hence the asset health index of the vehicle 102a may be dropping drastically. For example, as determined by the processing circuitry 206, the health index of the vehicle 102a may be constantly falling month by month. Therefore, the processing circuitry 206 may be further configured to swap (i.e., exchange) the vehicle 102a with another vehicle (such as, vehicle 102b) based on the constantly falling low health index of the vehicle 102a. Beneficially, taking away a good vehicle (i.e., a healthy vehicle) from a bad driver prevents a further deterioration in the health index of the good vehicle.

In an embodiment, the processing circuitry 206 may be configured to generate a notification based on the selected outcome for the vehicle 102a. The network interface 204 may be configured to communicate the notification to the driver device 212. For example, the processing circuitry 206 may generate an in-fleet notification to be communicated to the driver device 212 for in-fleeting the vehicle 102a due to a high health index of the vehicle 102a. In another example, the processing circuitry 206 may generate an off-road notification to be communicated to the driver device 212 for off-roading the vehicle 102a due to a low health index of the vehicle 102a.

Figure 3A:
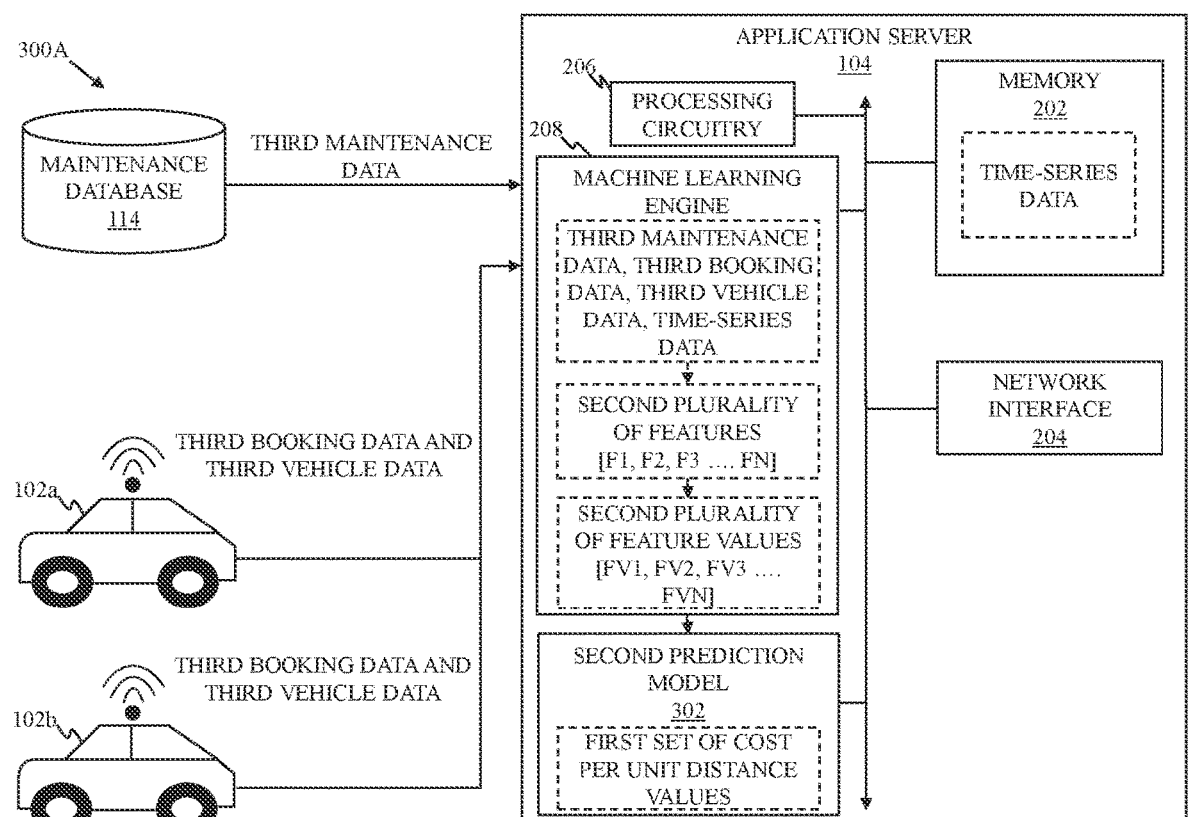
FIGS. 3A and 3B are block diagrams that illustrate an exemplary scenario for training a second prediction model for forecasting cost per unit distance values associated with one or more components of an asset (i.e., a vehicle) over a future time-interval, in accordance with an exemplary embodiment of the disclosure.
Figure 3B:
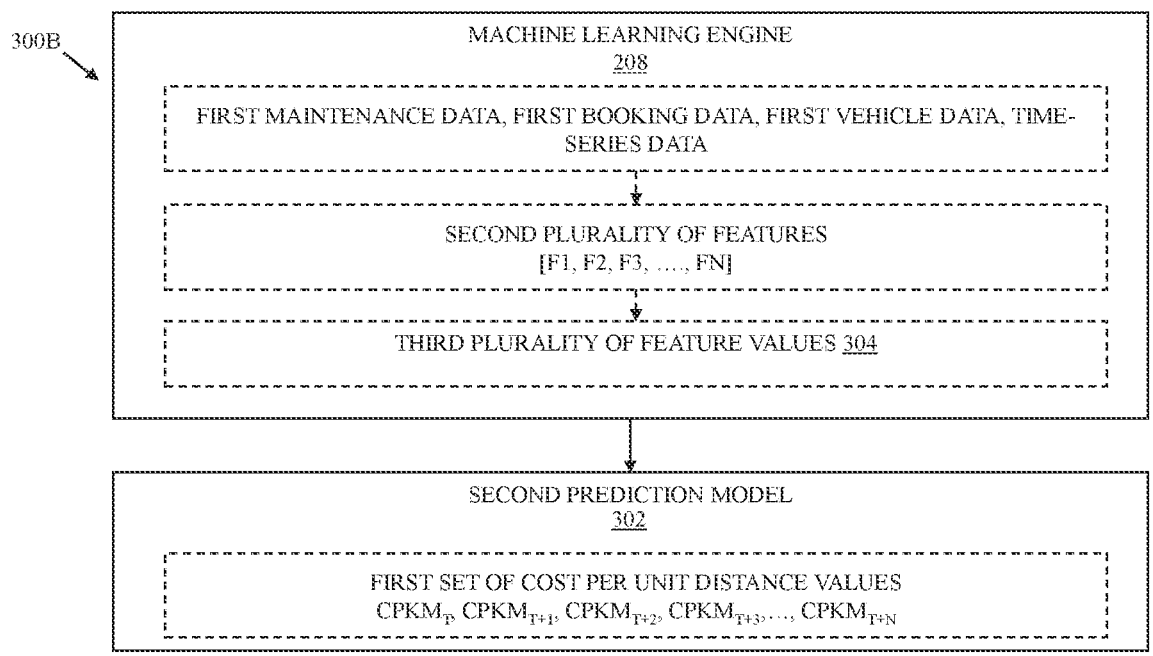

FIGS. 3A and 3B are block diagrams that illustrates exemplary scenarios 300A and 300B for training the second prediction model for forecasting cost per unit distance values for one or more components of an asset (i.e., a vehicle) over a future time-interval, in accordance with an exemplary embodiment of the disclosure. The application server 104 may include the memory 202, the network interface 204, the processing circuitry 206, the machine learning engine 208, and the second prediction model. Hereinafter, the second prediction model is referred to and designated as "the second prediction model 302". For the sake of brevity, the training of the second prediction model 302 is described with respect to the vehicles 102a and 102b; however, it will be apparent to a person of ordinary skill in the art that the second prediction model 302 can be trained based on other vehicles also, without deviating from the scope of the invention.

When the application server 104 is operating in the training phase, the machine learning engine 208 may be configured to retrieve the third maintenance data, the third vehicle data, the third booking data, and the time-series data, for the vehicles 102a and 102b, from the memory 202. The collection of the third maintenance data, the third vehicle data, the third booking data, and the time-series data may be performed similar to the collection of the first maintenance data, the first booking data, the first vehicle data, the first operational data, and the labelled dataset as described in the foregoing description of FIGS. 1A and 1B.

In an embodiment, the application server 104 may be configured to receive the third maintenance data, the third vehicle data, the third booking data, and the time-series data from the database server 106. In another embodiment, the application server 104 may be configured to receive at least a portion of the third maintenance data, the third vehicle data, the third booking data, and the time-series data from one of the driver device 102a, the maintenance system 110, and the transportation service provider.

The maintenance data collected over the second time-interval may be referred as the third maintenance data. The vehicle data collected over the second time-interval may be referred as the third vehicle data. The booking data collected over the second time-interval may be referred as the third booking data. The second time interval may occur prior to the first time-interval. In an embodiment, the third maintenance data, the third vehicle data, and the third booking data may be timestamped for a plurality of time-instances during the second time-interval. For example, the third maintenance data, the third vehicle data, and the third booking data may include day level or month level data for the second time-interval.

For example, the count of scheduled maintenances of the vehicles 102a and 102b indicated by the third maintenance data may be timestamped in a chronological order for the plurality of time-instances (e.g., a plurality of days or a plurality of months) during the second time-interval. Thus, the third maintenance data may indicate the count of scheduled maintenances of the vehicle 102a at a time-instance T-1, the count of scheduled maintenances of the vehicle 102a at a time-instance T-2, and the count of scheduled maintenances of the vehicle 102a at a time-instance T-3. The time instances T-1, T-2, and T-3 occur during the second time-interval. In another example, the count of accidents of the vehicles 102a and 102b indicated by the third maintenance data may be timestamped in a chronological order for the plurality of time-instances during the second time-interval. Thus, the third maintenance data may indicate the count of accidents of the vehicle 102a at the time-instance T-1, the count of accidents of the vehicle 102a at the time-instance T-2, and the count of accidents of the vehicle 102a at the time-instance T-3. Likewise, the other information included in the third maintenance data may be timestamped, for example, at day level, week level, month level, or the like.

In another example, the active age of the vehicles 102a and 102b as indicated by the third vehicle data may be timestamped in a chronological order for the plurality of time-instances during the second time-interval. Thus, the third vehicle data may include the active age of the vehicle 102a at the time-instance T-1, the active age of the vehicle 102a at the time-instance T-2, and the active age of the vehicle 102a at the time-instance T-3. In another embodiment, the dormant age of the vehicles 102a and 102b indicated by the third vehicle data may be timestamped in a chronological order for the plurality of time-instances during the second time-interval. Thus, the third vehicle data may include the dormant age of the vehicle 102a at the time-instance T-1, the dormant age of the vehicle 102a at the time-instance T-2, and the dormant age of the vehicle 102a at the time-instance T-3. Likewise, the other information included in the third vehicle data may be timestamped, for example, at day level, week level, month level, or the like.

In another example, the dry run distance of the vehicles 102a and 102b as indicated by the third booking data may be timestamped in a chronological order for the plurality of time-instances during the second time-interval. Thus, the third booking data may include the dry run distance travelled by the vehicle 102a at the time-instance T-1, the dry run distance travelled by the vehicle 102a at the time-instance T-2, and a dry run distance travelled by the vehicle 102a at the time-instance T-3. Likewise, the other information included in the third booking data may be timestamped, for example, at day level, week level, month level, or the like.

The time-series data may include the second set of cost per unit distance values associated with the one or more components of each vehicle 102a and 102b such that cost per unit distance values are timestamped in a chronological order for the plurality of time-instances during the second time-interval. Examples of the one or more components of a vehicle may include, but are not limited to, a battery, an alternator, a clutch, a cooling system, a steering wheel, a brake, an engine, a fuel injector, a radiator, a suspension, an AC compressor, and the like. For example, the time-series data may include a cost per unit distance value of the battery of the vehicle 102a at the time-instance T-1, the cost per unit distance value of the battery at the time-instance T-2, and the cost per unit distance value of the battery at the time-instance T-3. The second set of cost per unit distance values in the time-series data may be the actual cost per unit distance values for the one or more components of the vehicles 102a and 102b observed during the second time-interval.

Further, the machine learning engine 208 may use various feature or variable selection techniques to analyze the third maintenance data, the third vehicle data, the third booking data, and the time-series data, and determine the second plurality of features [F1, F2, . . . , FN] that are direct or indirect indicators of the cost per unit distance of the one or more components. For example, the machine learning engine 208 may determine that a total distance travelled by a vehicle, a count of bookings per day for a vehicle, and a count of non-scheduled maintenances of a vehicle are indicators of the cost per unit distance of the one or more component of the vehicle. The machine learning engine 208 may be further configured to determine a second plurality of feature values [FV1, . . . , FVN] corresponding to the second plurality of features [F1, . . . , FN] based on the third maintenance data, the third vehicle data, and the third booking data. In an embodiment, the second plurality of feature values [FV1, . . . , FVN] may include values corresponding to each of the second plurality of features [F1, . . . , FN] at the plurality of time-instances during the second time-interval for each vehicle 102a and 102b.

In an embodiment, the second plurality of features [F1, F2, . . . , FN] may include a total repair and maintenance cost incurred by a vehicle, an overall cost incurred due to accident of a vehicle, a cost per unit distance incurred for one or more components of a vehicle, and an odometer reading of a vehicle. In such an embodiment, the second plurality of feature values [FV1, FV2, . . . , FVN] may include the total repair and maintenance cost incurred by each vehicle 102a and 102b at the plurality of time-instances, the overall cost incurred due to accidents of each vehicle 102a and 102b at the plurality of time-instances, the actual cost per unit distance incurred for the one or more components of each vehicle 102a and 102b at the plurality of time-instances, and the odometer reading of each vehicle 102a and 102b at the plurality of time-instances. In one example, the different time-instances may refer to each month during the second time-interval. In another example, the different time-instances may refer to each day during the second time-interval. In another example, the different time-instances may refer to each week during the second time-interval.

In another embodiment, the second plurality of features [F1, F2, ..., FN] may further include vehicle make, vehicle model, region of operation of a vehicle, vehicle age, active age of a vehicle, dormant age of a vehicle, repair downtime of a vehicle, active duration of a vehicle, and dormant duration of a vehicle. In such an embodiment, the second plurality of feature values [FV1, ..., FVN] may include the vehicle make of each vehicle 102a and 102b, the vehicle model of each vehicle 102a and 102b, the region of operation of each vehicle 102a and 102b at the plurality of time-instances, and the vehicle age of each vehicle 102a and 102b at the plurality of time-instances. The second plurality of feature values [FV1, ..., FVN] may further include an active age of each vehicle 102a and 102b at the plurality of time-instances, a dormant age of each vehicle 102a and 102b during the second time-interval at the plurality of time-instances, a repair downtime of each vehicle 102a and 102b at the plurality of time-instances, an active duration of each vehicle 102a and 102b, during the second time-interval, at the plurality of time-instances, and a dormant duration of each vehicle 102a and 102b, during the second time-interval, at the plurality of time-instances.

In another embodiment, the second plurality of features [F1, ..., FN] may further include a total distance travelled by a vehicle, a count of unique drivers associated with a vehicle, an average distance travelled a vehicle between consecutive failures, an average distance travelled by a vehicle between consecutive accidents, and an average distance travelled by a vehicle between consecutive refurbishments. In such an embodiment, the second plurality of feature values [FV1, ..., FVN] may further include the total distance travelled by each vehicle 102a and 102b at the plurality of time-instances, the count of unique drivers associated with each vehicle 102a and 102b at the plurality of time-instances, and the average distance travelled by each vehicle 102a and 102b between consecutive failures at the plurality of time-instances. The second plurality of feature values [FV1, ..., FVN] may further include the average distance travelled by each vehicle 102a and 102b between the consecutive accidents at the plurality of time-instances and the average distance travelled by each vehicle 102a and 102b between the consecutive refurbishments at the plurality of time-instances.

In another embodiment, the second plurality of features [F1, ..., FN] may further include absolute deviation from scheduled maintenances of a vehicle, count of scheduled maintenances of a vehicle, a count of non-scheduled maintenances of a vehicle, a count of accidents of a vehicle, and an average repair time for a vehicle. In such an embodiment, the second plurality of feature values [FV1, ..., FVN] may further include the absolute deviation from scheduled maintenances of each vehicle 102a and 102b, the count of scheduled maintenances of each vehicle 102a and 102b at the plurality of time-instances, and the count of non-scheduled maintenances of each vehicle 102a and 102b at the plurality of time-instances. The second plurality of feature values [FV1, ..., FVN] may further include the count of accidents of each vehicle 102a and 102b at the plurality of time-instances and the average repair time for each vehicle 102a and 102b at the plurality of time-instances.

In another embodiment, the second plurality of features [F1, ..., FN] may further include a dry run distance travelled by a vehicle, a trip distance travelled by a vehicle, an excess distance travelled by a vehicle, a count of bookings per day for a vehicle, and a distance travelled per day by a vehicle. In another embodiment, the second plurality of features F1 through FN may further include an actual cost of the one or more components (for example, a battery, an alternator, a clutch, a cooling system, a steering wheel, a brake, and the like) of a vehicle. In such an embodiment, the second plurality of feature values [FV1, ..., FVN] may further include the dry run distance travelled by each vehicle 102a and 102b at the plurality of time-instances, the trip distance travelled by each vehicle 102a and 102b at the plurality of time-instances, the excess distance travelled by each vehicle 102a and 102b at the plurality of time-instances, and the count of bookings per day for each vehicle 102a and 102b at the plurality of time-instances. The second plurality of feature values [FV1, ..., FVN] may include the distance travelled per day by each vehicle 102a and 102b at the plurality of time-instances and an actual cost of the one or more components of each vehicle 102a and 102b at the plurality of time-instances.

In one embodiment, each feature of the second plurality of features [F1, ..., FN] may be assigned a weight corresponding to a degree of correlation between the feature and an observed cost per unit distance of the one or more components of the vehicles 102a and 102b. For example, a first feature (e.g., total distance travelled by a vehicle) may be assigned a higher weight than a second feature (e.g., average count of bookings per day for a vehicle), based on a determination by the machine learning engine 208 that the total distance travelled is a better predictor of profitability of a vehicle than the average count of bookings per day. It will be apparent to a person of ordinary skill in the art that the abovementioned second plurality of features [F1, ..., FN] and the second plurality of feature values [FV1, ... FVN] are for exemplary purpose and should not be construed as limitations to the scope of the disclosure.

The machine learning engine 208 may be configured to train the second prediction model 302 based on the second plurality of features [F1, ..., FN], the second plurality of feature values [FV1, ..., FVN], and the time-series data. For example, the machine learning engine 208 may provide the second plurality of features [F1, ..., FN], the second plurality of feature values [FV1, ..., FVN], and the time-series data as input to the second prediction model 302. The second prediction model 302 may correlate the second plurality of features [F1, ..., FN] and the second plurality of feature values [FV1, ..., FVN] with the actual cost per unit distance values, included in the time-series data, of the one or more components of each vehicle 102a and 102b at the plurality of time-instances during the second time-interval. In the current embodiment, for the sake of brevity, training data (i.e., the second plurality of features [F1, ..., FN], the second plurality of feature values [FV1, ..., FVN], and the time-series data) has been shown to correspond to a sample size of two (i.e., two vehicles 102a and 102b). However, in an actual implementation, the training data may correspond to a large sample size (e.g., a sample size of a thousand vehicles, ten thousand vehicles, or a million vehicles).

The machine learning engine 208 may train the second prediction model 302 using one or more machine learning algorithms such a logistic regression algorithm, or the like. Examples of the second prediction model 302 may include a Long short-term memory (LSTM) model, a Convolutional LSTM (ConvLSTM) model, a Vector autoregression (VAR) model, an AutoRegressive integrated moving average (ARIMA) model, a Seasonal autoregressive integrated moving average (SARIMA) model, a Prophet forecasting model, the Copula-based forecasting model, the deep learning based forecasting model, or a recurrent neural network based forecasting model.

In an embodiment, the machine learning engine 208 may be further configured to validate an accuracy level of the trained second prediction model 302. For example, the machine learning engine 208 may provide maintenance data, booking data, and vehicle data associated with the test vehicle as an input to the trained second prediction model 302. The second prediction model 302 may forecast cost per unit distance values associated with one or more components of the test vehicle. The machine learning engine 208 may be further configured to compare the forecasted cost per unit distance values with a known actual cost per unit distance values associated with the one or more components of the test vehicle. Based on comparison of the forecasted cost per unit distance values with the known actual cost per unit distance values, the machine learning engine 208 may be configured to generate a validation output. The validation output may be used by the trained second prediction model 302 as feedback to improve the accuracy of the trained second prediction model 302.

With reference to FIG. 3B, upon training, the second prediction model 302 may be configured to forecast, based on the first maintenance data, the first booking data, and the vehicle data, the first set of cost per unit distance values associated with the one or more components of each vehicle 102a and 102b. The machine learning engine 208 may retrieve the first maintenance data, the first booking data, and the first vehicle data stored in the memory 202. The machine learning engine 208 may further retrieve time-series data associated with the first time-interval from the memory 202. The time-series data associated with the first time-interval includes the actual cost per unit distance (i.e., CPKM) values of the one or more components of the vehicles 102a and 102b during the first time-interval.

The machine learning engine 208 may be further configured to determine a third plurality of feature values 304 corresponding to each of the second plurality of features [F1, . . . , FN] for a plurality of time-instances in the first time-interval. Based on the third plurality of feature values 304, the second prediction model 302 may be configured to forecast the first set of cost per unit distance values for the one or more components of the vehicles 102a and 102b. The first set of cost per unit distance values may include cost per kilometer values [$CPKM_T, \ldots, CPKM_{T+N}$] for the one or more components of the vehicle 102a. The time instances T through T+1 are future time-instances in the future time-interval. For example, if the first time-interval corresponds to Jan. 1-Dec. 31, 2019, the future time-interval may be Jan. 1-Dec. 31, 2020 and the future time-instances may be the months of the year 2020.

Figure 4:
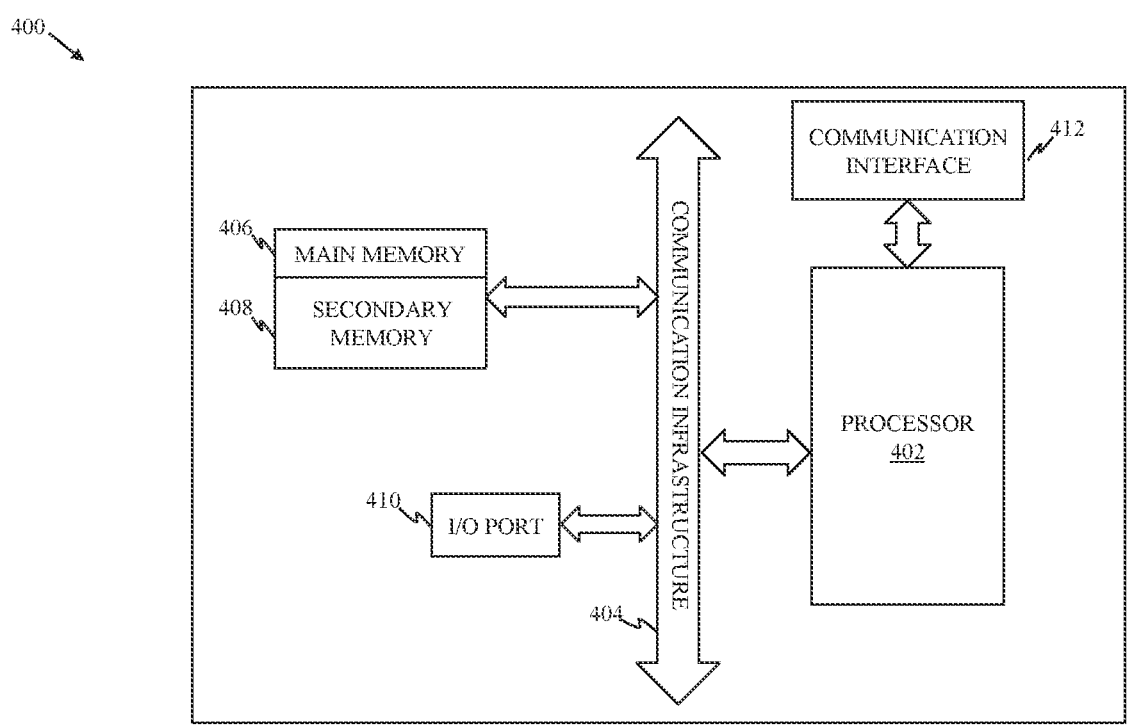
FIG. 4 is a block diagram that illustrates a system architecture of a computer system for asset health management, in accordance with an exemplary embodiment of the disclosure.

FIG. 4 is a block diagram that illustrates a system architecture of a computer system 400 for asset health management, in accordance with an exemplary embodiment of the disclosure. An embodiment of the disclosure, or portions thereof, may be implemented as computer readable code on the computer system 400. In one example, the application server 104 or the database server 106 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5 and 6.

The computer system 400 may include a processor 402 that may be a special purpose or a general-purpose processing device. The processor 402 may be a single processor or multiple processors. The processor 402 may have one or more processor "cores." Further, the processor 402 may be coupled to a communication infrastructure 404, such as a bus, a bridge, a message queue, the communication network 112, multi-core message-passing scheme, or the like. The computer system 400 may further include a main memory 406 and a secondary memory 408. Examples of the main memory 406 may include RAM, ROM, and the like. The secondary memory 408 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 400 may further include an input/output (I/O) port 410 and a communication interface 412. The I/O port 410 may include various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communication port, and the like. Data transferred via the communication interface 412 may be signals, such as electronic, electromagnetic, optical, or other signals as will be apparent to a person skilled in the art. The signals may travel via a communications channel, such as the communication network 112, which may be configured to transmit the signals to the various devices that are communicatively coupled to the computer system 400. Examples of the communication channel may include a wired, wireless, and/or optical medium such as cable, fiber optics, a phone line, a cellular phone link, a radio frequency link, and the like. The main memory 406 and the secondary memory 408 may refer to non-transitory computer readable mediums that may provide data that enables the computer system 400 to implement the methods illustrated in FIGS. 5 and 6.

Figure 5:
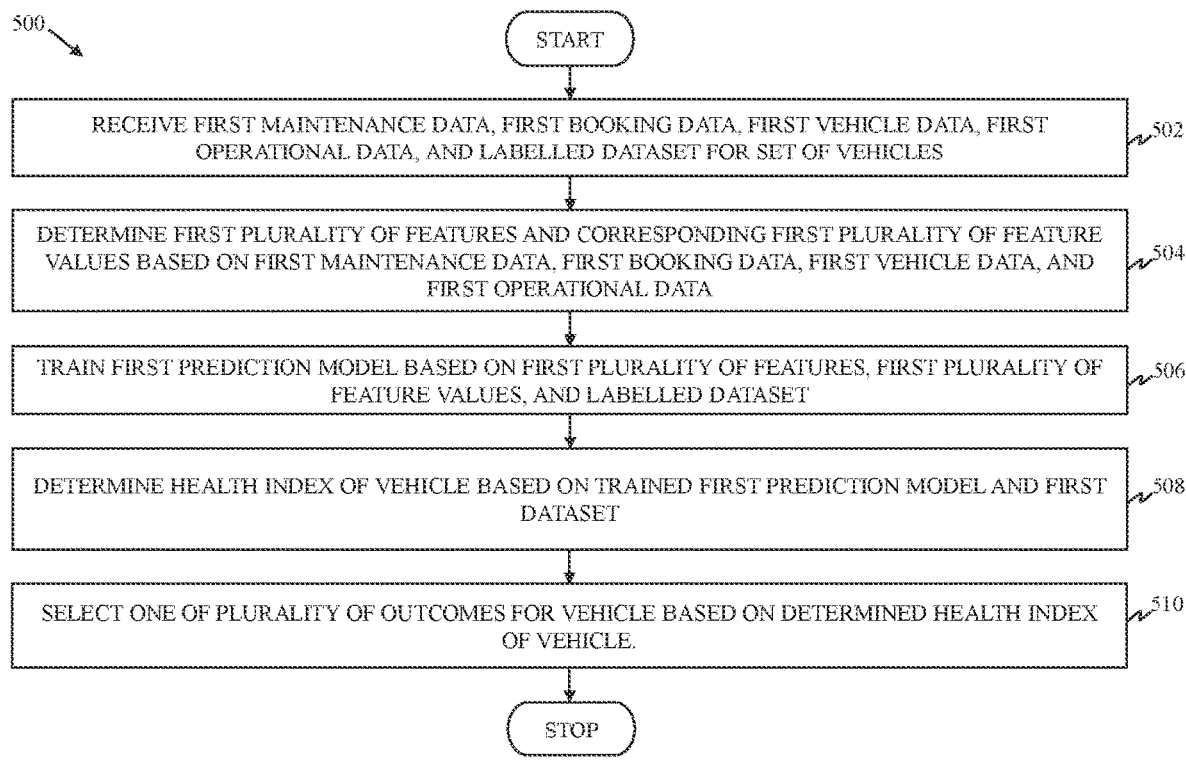
FIG. 5 is a flowchart that illustrates a method for asset health management, in accordance with an exemplary embodiment of the disclosure.

FIG. 5 is a flowchart 500 that illustrates a method for asset health management, in accordance with an exemplary embodiment of the disclosure.

At 502, the first maintenance data, the first booking data, the first vehicle data, the first operational data, and the labelled dataset for each vehicle 102a and 102b is received. The application server 104 is configured to receive the first maintenance data, the first booking data, the first vehicle data, the first operational data, and the labelled dataset for each vehicle 102a and 102b. The labelled dataset includes the actual health index observed over the first time-interval for each vehicle 102a and 102b.

At 504, the first plurality of features 214 and the corresponding first plurality of feature values 216 are determined based on the first maintenance data, the first booking data, the first vehicle data, and the first operational data. The application server 104 is configured to determine the first plurality of features 214 and the corresponding first plurality of feature values 216 based on the first maintenance data, the first booking data, the first vehicle data, and the first operational data. The first plurality of features 214 include at least the forecasted cost per unit distance of one or more vehicle components. The first plurality of feature values 216 include at least the first set of cost per unit distance values forecasted over the future time-interval for the one or more components of each vehicle 102a and 102b.

At 506, the first prediction model 210 is trained based on the first plurality of features 214, the first plurality of feature values 216, and the labelled dataset. The application server 104 is configured to train the first prediction model 210 based on the first plurality of features 214, the first plurality of feature values 216, and the labelled dataset.

At 508, the health index of the vehicle 102a is determined based on the trained first prediction model 210 and the first dataset associated with the vehicle 102a. The application server 104 is configured to determine the health index of the vehicle 102a based on the trained first prediction model 210 and the first dataset associated with the vehicle 102a. The first dataset includes the second maintenance data, the second booking data, the second vehicle data, and the second operational data for the vehicle 102a.

At 510, one of the plurality of outcomes for the vehicle 102a is selected based on the determined health index of the vehicle 102a. The application server 104 is configured to select one of the plurality of outcomes for the vehicle 102a based on the determined health index of the vehicle 102a. The plurality of outcomes include one of the refurbishment of the vehicle 102a, the off-roading of the vehicle 102a, the onboarding of the vehicle 102a, the selling of the vehicle 102a, and the buying of the vehicle 102a.

Figure 6:
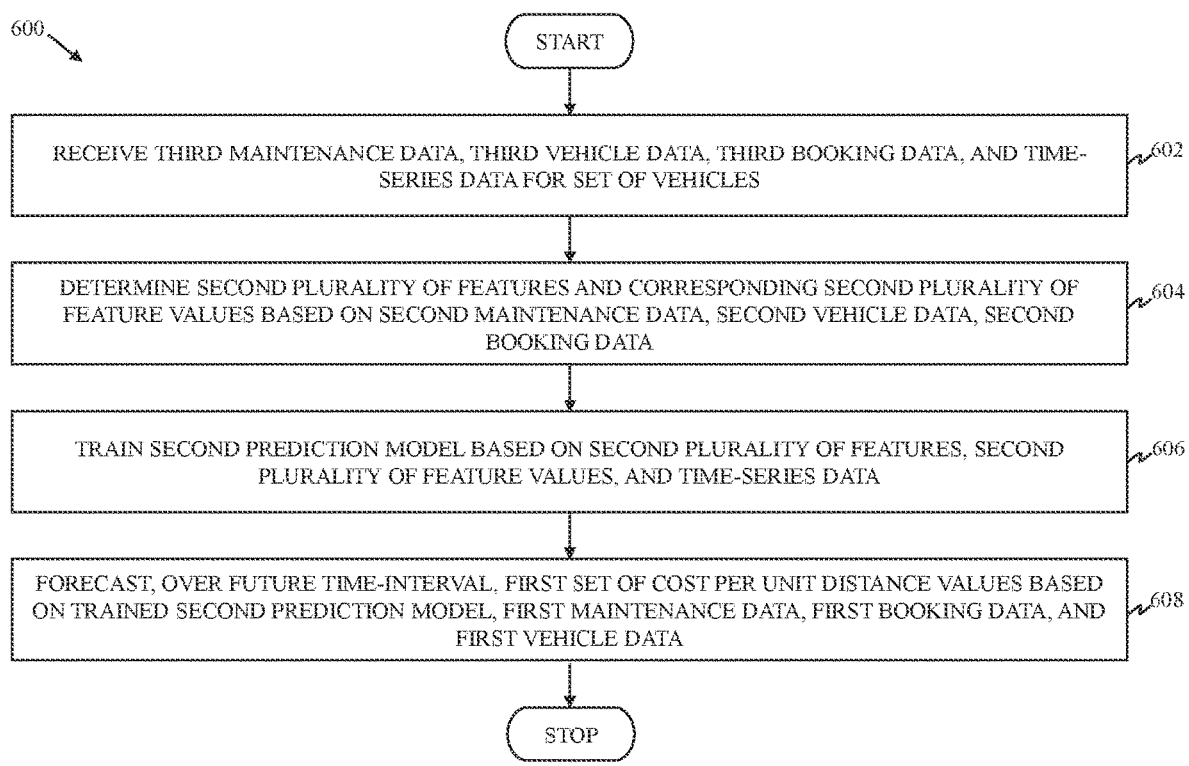
FIG. 6 is a flowchart that illustrates a method for determining cost per unit distance values for one or more components of an asset, in accordance with an exemplary embodiment of the disclosure.

FIG. 6 is a flowchart 600 that illustrates a method for forecasting cost per unit distance values for one or more components of an asset, in accordance with an exemplary embodiment of the disclosure.

At 602, the third maintenance data, the third vehicle data, the third booking data, and the time-series data is received for each vehicle 102a and 102b. The application server 104 is configured to receive the third maintenance data, the third vehicle data, the third booking data, and the time-series data for each vehicle 102a and 102b. The third maintenance data, the third vehicle data, and the third booking data are associated with the second time-interval. The time-series data includes the second set of cost per unit distance values observed during the second time-interval for the one or more components of each vehicle 102a and 102b.

At 604, the second plurality of features [F1, . . . , FN] and the corresponding second plurality of feature values [FV1, . . . , FVN] are determined based on the second maintenance data, the second vehicle data, and the second booking data. The application server 104 is configured to determine the second plurality of features [F1, . . . , FN] and the corresponding second plurality of feature values [FV1, . . . , FVN] based on the second maintenance data, the second vehicle data, and the second booking data.

At 606, the second prediction model 302 is trained based on the second plurality of features [F1, . . . , FN], the second plurality of feature values [FV1, . . . , FVN], and the time-series data. The application server 104 is configured to train the second prediction model 302 based on the second plurality of features [F1, . . . , FN], the second plurality of feature values [FV1, . . . , FVN], and the time-series data.

At 608, the first set of cost per unit distance values, over the future time-interval, are forecasted based on the trained second prediction model 302, the first maintenance data, the first booking data, and the first vehicle data. The application server 104 is configured to forecast, over the future time-interval, the first set of cost per unit distance values based on the trained second prediction model 302, the first maintenance data, the first booking data, and the first vehicle data.

Various embodiments of the disclosure provide the application server 104 for asset health management. The application server 104 may be configured to receive, the first maintenance data, the first booking data, the first vehicle data, the first operational data, and the labelled dataset for each vehicle 102a and 102b. The first maintenance data, the first booking data, the first vehicle data, and the first operational data are received over the first time-interval. The labelled dataset includes the actual health index observed over the first time-interval for each vehicle 102a and 102b. The application server 104 may be further configured to determine the first plurality of features 214 and the corresponding first plurality of feature values 216 based on the first maintenance data, the first booking data, the first vehicle data, and the first operational data. The first plurality of features 214 include at least the forecasted cost per unit distance. The first plurality of feature values 216 include the first set of cost per unit distance values forecasted over the future time-interval for one or more components of each vehicle 102a and 102b. The application server 104 may be further configured to train the first prediction model 210 based on the first plurality of features 214, the first plurality of feature values 216, and the labelled dataset. The application server 104 may be further configured to determine the health index of the vehicle 102a based on the trained first prediction model 210 and the first dataset associated with the vehicle 102a. The first dataset includes the second maintenance data, the second booking data, the second vehicle data, and the second operational data for the vehicle.

The application server 104 may be further configured to receive the third maintenance data, the third vehicle data, the third booking data, and the time-series data for each vehicle 102a and 102b. The third maintenance data, the third vehicle data, and the third booking data are associated with the second time-interval. The time-series data includes the second set of cost per unit distance values observed during the second time-interval for the one or more components of each vehicle 102a and 102b. The application server 104 may be further configured to determine the second plurality of features [F1, . . . , FN] and the corresponding second plurality of feature values [FV1, . . . , FVN] based on the second maintenance data, the second vehicle data, and the second booking data. The application server 104 may be further configured to train the second prediction model 302 based on the second plurality of features [F1, . . . , FN], the second plurality of feature values [FV1, . . . , FVN], and the time-series data. The application server 104 may be further configured to forecast over the future time-interval, the first set of cost per unit distance values based on the trained second prediction model 302, the first maintenance data, the first booking data, and the first vehicle data.

Various embodiments of the disclosure provide a non-transitory computer readable medium having stored thereon, computer executable instructions, which when executed by a computer, cause the computer to execute one or more operations for asset health management. The one or more operations include receiving the first maintenance data, the first booking data, the first vehicle data, the first operational data, and the labelled dataset for the vehicles 102a and 102b. The first maintenance data, the first booking data, the first vehicle data, and the first operational data are received over the first time-interval. The labelled dataset includes at least the actual health index observed over the first time-interval for each vehicle 102a and 102b. The one or more operations further include determining the first plurality of features 214 and the corresponding first plurality of feature values 216 based on the first maintenance data, the first booking data, the first vehicle data, and the first operational data. The first plurality of features 214 include the forecasted cost per unit distance. The first plurality of feature values 216 include the first set of cost per unit distance values forecasted over the future time-interval for the one or more components of each vehicle 102a 102b. The one or more operations further include training the first prediction model 210 based on the first plurality of features 214, the first plurality of feature values 216, and the labelled dataset. The one or more operations further include determining the health index of the vehicle 102a based on the trained first prediction model 210 and the first dataset associated with the vehicle 102a. The first dataset includes the second maintenance data, the second booking data, the second vehicle data, and the second operational data for the vehicle 102a.

The one or more operations further include receiving the third maintenance data, the third vehicle data, the third booking data, and the time-series data for each vehicle 102a and 102b. The third maintenance data, the third vehicle data, and the third booking data are associated with the second time-interval. The time-series data includes the second set of cost per unit distance values observed during the second time-interval for the one or more components of each vehicle 102a and 102b. The one or more operations further include determining the second plurality of features [F1, . . . , FN] and the corresponding second plurality of feature values [FV1, . . . , FVN] based on the second maintenance data, the second vehicle data, and the second booking data. The one or more operations further include training the second prediction model 302 based on the second plurality of features [F1, . . . , FN], the second plurality of feature values [FV1, . . . , FVN], and the time-series data. The one or more operations further include forecasting over the future time-interval, the first set of cost per unit distance values based on the trained second prediction model 302, the first maintenance data, the first booking data, and the first vehicle data.

The disclosed embodiments encompass numerous advantages. Exemplary advantages of the disclosed methods include, but are not limited to, ensuring continuous monitoring of the health, performance, profitability, and utilization of the vehicle 102a. Further, the disclosed methods and systems allow for a predictive maintenance of the vehicle 102a. Therefore, a breakdown or damage to the vehicle 102a may be predicted and avoided in time. Hence, the disclosed methods and systems allow elimination of a financial loss and inconvenience caused due to unexpected breakdowns of the vehicle 102a. Therefore, the disclosed methods and systems minimize a maintenance cost and maximize a utilization of the vehicle 102a. Further, disclosed methods significantly reduce a time consumption and human intervention required for determination of the health and profitability of the vehicle 102a. Further, the disclosed methods and systems also allow for forecast of a cost associated with the vehicle 102a for the future time-interval. Therefore, an estimation of a future cost associated with the vehicle 102a allows for timely replacement and maintenance of the vehicle 102a in order to optimize the utilization and the performance of the vehicle 102a. The disclosed systems and methods may be used by a vehicle aggregator, a transportation service provider, an individual owner, and the like. In contrast to conventional techniques where asset health index of a vehicle is determined based on present performance and utilization of the vehicle, the technological advancements in the application server 104 allows to leverage forecasted cost per unit distance values for determining the asset health index of the vehicle.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for asset health management. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for asset health management, the method comprising:
   retrieving, by a server, from a database associated with a transportation service provider corresponding to a set of vehicles, a first maintenance data, a first booking data, a first vehicle data, a first operational data, and a labelled dataset for the set of vehicles over a first time-interval, wherein the set of vehicles are communicatively coupled to a communication network, wherein the labelled dataset includes at least an actual health index observed over the first time-interval for each vehicle of the set of vehicles;
   determining, by the server, a first plurality of features and a corresponding first plurality of feature values based on the first maintenance data, the first booking data, the first vehicle data, and the first operational data, wherein the first plurality of features comprises of at least one of a vehicle make, a vehicle model, a region of operation of a vehicle, an age of a vehicle, an active age of a vehicle, a dormant age of a vehicle, a repair downtime of a vehicle, an active duration of a vehicle, and a dormant duration of a vehicle, and wherein the first plurality of feature values include at least a first set of cost per unit distance values forecasted over a future time-interval occurring after the first time-interval for one or more components of each vehicle of the set of vehicles, and wherein determining the first set of cost per unit distance values comprises:
   receiving, by the server, a third maintenance data, a third vehicle data, a third booking data, and time-series data for the set of vehicles, wherein the third maintenance data, the third vehicle data, and the third booking data are associated with a second time-interval, wherein the second time-interval is prior to the first time-interval, and wherein the time-series data includes at least a second set of cost per unit distance values observed during the second time-interval for the one or more components of each vehicle of the set of vehicles;

determining, by the server, a second plurality of features and a corresponding second plurality of feature values based on the third maintenance data, the third vehicle data, and the third booking data;

training, by the server, a second prediction model based on the second plurality of features, the second plurality of feature values, and the time-series data;

correlating, by the server, the second plurality of features and the second plurality of feature value to the actual cost per unit distance values included in the time-series data of the one or more components of each vehicle of the set of vehicles during the second time-interval;

based on the correlation, forecasting, by the server, over the future time-interval, the first set of cost per unit distance values based on the trained second prediction model, the first maintenance data, the first booking data, and the first vehicle data;

inputting, by the server, the first set of cost per unit distance values into a first prediction model:

training, by the server, a first prediction model based on the first plurality of features, the first plurality of feature values, the first set of cost per unit distance values, and the labelled dataset; and generating, by the server, the health index of the target vehicle based on the trained first prediction model and a first dataset associated with the target vehicle.

2. The method of claim 1, wherein the first plurality of features further include at least one of a total distance travelled by a vehicle, a count of unique drivers associated with a vehicle, an average distance travelled between consecutive failures of a vehicle, an average distance travelled between consecutive accidents of a vehicle, and an average distance travelled between consecutive refurbishments of a vehicle.

3. The method of claim 1, wherein the first plurality of features further include at least one of an absolute deviation from a scheduled maintenance of a vehicle, a count of scheduled maintenances of a vehicle, a count of non-scheduled maintenances of a vehicle, a count of accidents of a vehicle, and an average repair time for a vehicle.

4. The method of claim 1, wherein the first plurality of features further include at least one of a dry run distance travelled by a vehicle, a trip distance travelled by a vehicle, an excess distance travelled by a vehicle, a count of bookings per day for a vehicle, and a distance travelled per day by a vehicle.

5. The method of claim 1, further comprising selecting, by the server, one of a plurality of outcomes for the target vehicle based on the determined health index of the target vehicle.

6. The method of claim 5, wherein the plurality of outcomes include at least one of a refurbishment of the target vehicle, an off-roading of the target vehicle, an onboarding of the target vehicle, selling of the target vehicle, and buying of the target vehicle.

7. A system for asset health management, the system comprising:
a server configured to:
retrieve, from a database associated with a transportation service provider corresponding to a set of vehicles, a first maintenance data, a first booking data, a first vehicle data, a first operational data, and a labelled dataset for the set of vehicles over a first time-interval, wherein the set of vehicles are communicatively coupled to a communication network, wherein the labelled dataset includes at least an actual health index observed over the first time-interval for each vehicle of the set of vehicles;

determine a first plurality of features and a corresponding first plurality of feature values based on the first maintenance data, the first booking data, the first vehicle data, and the first operational data, wherein the first plurality of features comprises of at least one of a vehicle make, a vehicle model, a region of operation of a vehicle, an age of a vehicle, an active age of a vehicle, a dormant age of a vehicle, a repair downtime of a vehicle, an active duration of a vehicle, and a dormant duration of a vehicle, and wherein the first plurality of feature values include at least a first set of cost per unit distance values forecasted over a future time-interval occurring after the first time-interval for one or more components of each vehicle of the set of vehicles, and wherein on determining the first set of cost per unit distance values, the server is further configured to:

receive, a third maintenance data, a third vehicle data, a third booking data, and time-series data for the set of vehicles, wherein the third maintenance data, the third vehicle data, and the third booking data are associated with a second time-interval wherein the second time-interval is prior to the first time-interval, and wherein the time-series data includes at least a second set of cost per unit distance values observed during the second time-interval for the one or more components of each vehicle of the set of vehicles;

determine, by the server, a second plurality of features and a corresponding second plurality of feature values based on the third maintenance data, the third vehicle data, and the third booking data;

train, by the server, a second prediction model based on the second plurality of features, the second plurality of feature values, and the time-series data;

correlate, by the server, the second plurality of features and the second plurality of feature value to the actual cost per unit distance values included in the time-series data of the one or more components of each vehicle of the set of vehicles during the second time-interval;

based on the correlation, forecast, by the server, over the future time-interval, the first set of cost per unit distance values based on the trained second prediction model, the first maintenance data, the first booking data, and the first vehicle data;

input, by the server, the first set of cost per unit distance values into a first prediction model:

train, by the server, a first prediction model based on the first plurality of features, the first plurality of feature values, the first set of cost per unit distance values, and the labelled dataset; and generate the health index of a target vehicle based on the trained first prediction model and a first dataset associated with the target vehicle.

8. The system of claim 7, wherein the first plurality of features further include at least one of a total distance travelled by a vehicle, a count of unique drivers associated with a vehicle, an average distance travelled between consecutive failures of a vehicle, an average distance travelled between consecutive accidents of a vehicle, and an average distance travelled between consecutive refurbishments of a vehicle.

9. The system of claim 7, wherein the first plurality of features further include at least one of an absolute deviation from a scheduled maintenance of a vehicle, a count of scheduled maintenances of a vehicle, a count of non-scheduled maintenances of a vehicle, a count of accidents of a vehicle, and an average repair time for a vehicle.

10. The system of claim 7, wherein the first plurality of features further include at least one of a dry run distance travelled by a vehicle, a trip distance travelled by a vehicle, an excess distance travelled by a vehicle, a count of bookings per day for a vehicle, and a distance travelled per day by a vehicle.

11. The system of claim 7, wherein the server is further configured to select one of a plurality of outcomes for the target vehicle based on the determined health index of the target vehicle.

12. The system of claim 11, wherein the plurality of outcomes include at least one of a refurbishment of the target vehicle, an off-roading of the target vehicle, an onboarding of the target vehicle, selling of the target vehicle, and buying of the target vehicle.

* * * * *